United States Patent
Kusama et al.

(10) Patent No.: US 9,753,191 B2
(45) Date of Patent: Sep. 5, 2017

(54) LIGHT DIFFUSION FILM AND LIGHT DIFFUSION FILM MANUFACTURING METHOD

(71) Applicant: LINTEC Corporation, Itabashi-Ku, Tokyo (JP)

(72) Inventors: Kentaro Kusama, Tokyo (JP); Baku Katagiri, Tokyo (JP); Tomoo Orui, Tokyo (JP); Satoru Shoshi, Tokyo (JP)

(73) Assignee: LINTEC Corporation, Tokyo (JP)

( * ) Notice: Subject to any disclaimer, the term of this patent is extended or adjusted under 35 U.S.C. 154(b) by 0 days.

(21) Appl. No.: 14/774,920

(22) PCT Filed: Feb. 25, 2014

(86) PCT No.: PCT/JP2014/054396
§ 371 (c)(1),
(2) Date: Sep. 11, 2015

(87) PCT Pub. No.: WO2014/156420
PCT Pub. Date: Oct. 2, 2014

(65) Prior Publication Data
US 2016/0025907 A1 Jan. 28, 2016

(30) Foreign Application Priority Data
Mar. 29, 2013 (JP) .................. 2013-074218

(51) Int. Cl.
| G02B 5/02 | (2006.01) |
| C08F 299/06 | (2006.01) |
| C08L 33/14 | (2006.01) |
| C08L 55/00 | (2006.01) |
| G02F 1/1335 | (2006.01) |

(52) U.S. Cl.
CPC ........ G02B 5/0247 (2013.01); C08F 299/065 (2013.01); C08L 33/14 (2013.01);
(Continued)

(58) Field of Classification Search
CPC ...... G02B 5/02; G02B 5/0205; G02B 5/0236; G02B 5/0242; G02B 5/0247;
(Continued)

(56) References Cited

U.S. PATENT DOCUMENTS

| 6,435,683 B1 * | 8/2002 | Milner ............... E06B 9/24 |
| | | 359/599 |
| 2001/0019748 A1 * | 9/2001 | Beeson ............... G02B 5/0215 |
| | | 428/14 |
| 2006/0057307 A1 | 3/2006 | Matsunaga et al. |
| 2006/0238853 A1 | 10/2006 | Morimoto et al. |
| 2007/0285941 A1 | 12/2007 | Ishihara et al. |

FOREIGN PATENT DOCUMENTS

| JP | 63-151648 A | 6/1988 |
| JP | 63-309902 A | 12/1988 |

(Continued)

OTHER PUBLICATIONS

Miyadera et al., JP 2013-019988, English Language Machine Translation, Created Sep. 27, 2016.*

Primary Examiner — Stephone B Allen
Assistant Examiner — Adam W Booher
(74) Attorney, Agent, or Firm — Renner Kenner; Arthur M. Reginelli

(57) ABSTRACT

Provided are a light diffusion film having a single-layered light diffusion layer, in which the uniformity of the intensity of diffused light in the light diffusion angle region can be increased, or the light diffusion angle region can be expanded effectively, by regulating the combination of the angles of inclination of pillar-shaped objects in plural columnar structure regions, and a method for manufacturing a light diffusion film. Disclosed is a light diffusion film having a single-layered light diffusion layer, the light diffusion film having a first columnar structure region and a second columnar structure region, in which plural pillar-shaped objects having a relatively high refractive index are arranged to stand close together in a region having a relatively low refractive index, sequentially from the lower part of the film along the film plane.

9 Claims, 19 Drawing Sheets

(52) U.S. Cl.
CPC .......... *C08L 55/005* (2013.01); *G02B 5/0236* (2013.01); *G02B 5/0257* (2013.01); *G02B 5/0268* (2013.01); *G02B 5/0278* (2013.01); *G02F 1/133504* (2013.01); *G02B 2207/123* (2013.01)

(58) Field of Classification Search
CPC .. G02B 5/0257; G02B 5/0268; G02B 5/0278; G02B 2207/123; G02B 2207/107; G02B 1/10; G02B 1/11–1/118; C08F 299/065; C08L 33/14; C08L 55/005; G02F 1/133502; G02F 1/133504; G02F 1/133606; B82Y 20/00
See application file for complete search history.

(56) References Cited

FOREIGN PATENT DOCUMENTS

| | | | |
|---|---|---|---|
| JP | 2002189105 A | * | 7/2002 |
| JP | 2004-244474 A | | 9/2004 |
| JP | 2005-227566 A | | 8/2005 |
| JP | 2005-292219 A | | 10/2005 |
| JP | 2005-326824 A | | 11/2005 |
| JP | 2006-010802 A | | 1/2006 |
| JP | 2006-323379 A | | 11/2006 |
| JP | 2009-173018 A | | 8/2009 |
| JP | 2009-211868 A | | 9/2009 |
| JP | 2011-095563 A | | 5/2011 |
| JP | 2012-141593 A | | 7/2012 |
| JP | 2013-019988 A | | 1/2013 |
| WO | 2005-101065 A | | 10/2005 |

* cited by examiner

Fig.2(a) LIGHT DIFFUSION INCIDENT ANGLE REGION
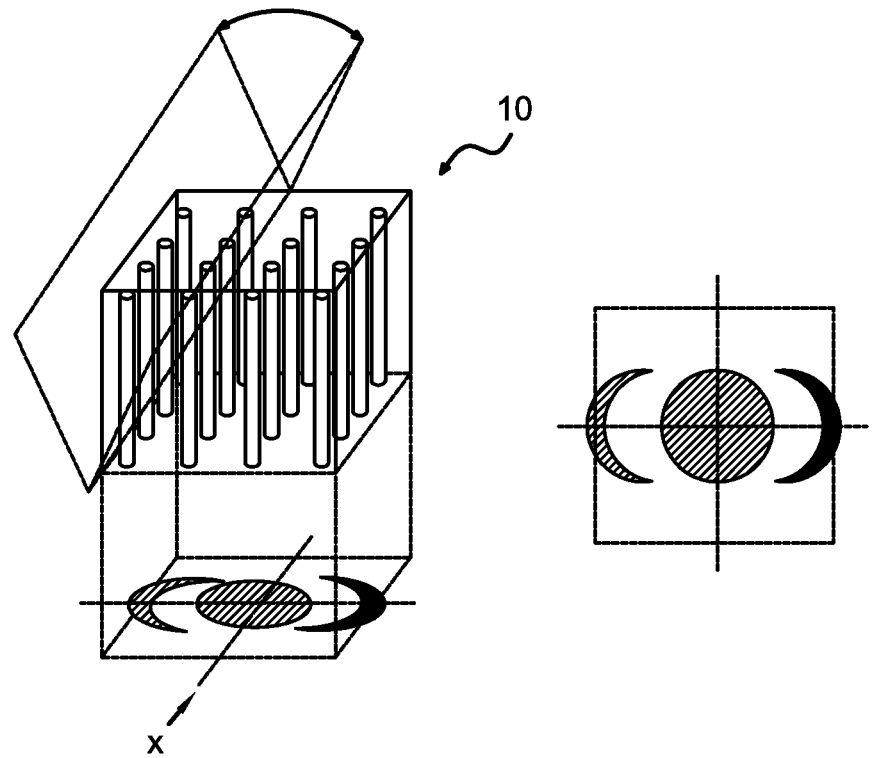
Fig.2(b)
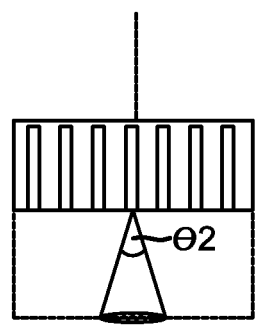

LIGHT DIFFUSION INCIDENT ANGLE REGION

LIGHT DIFFUSION INCIDENT ANGLE REGION

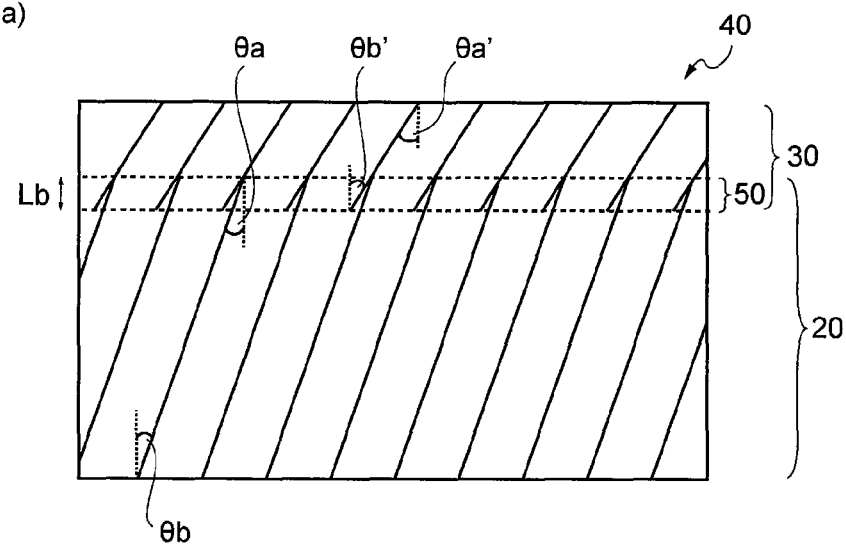
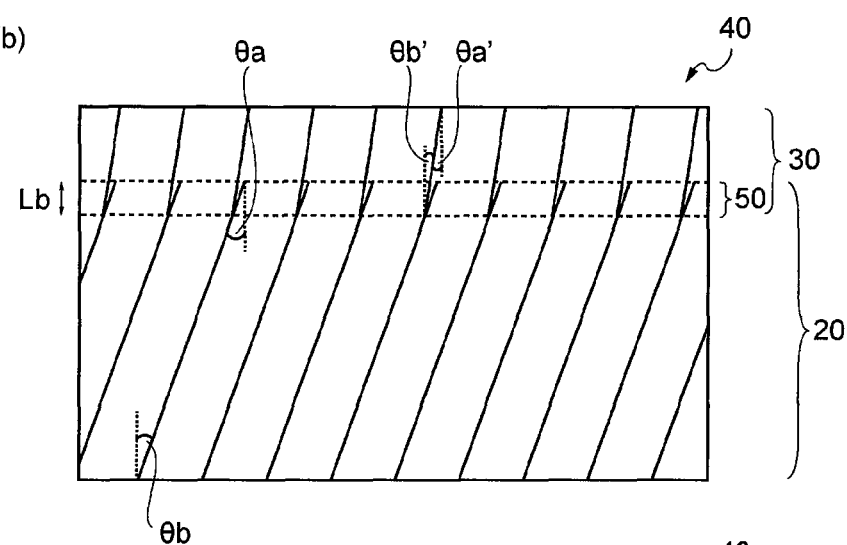
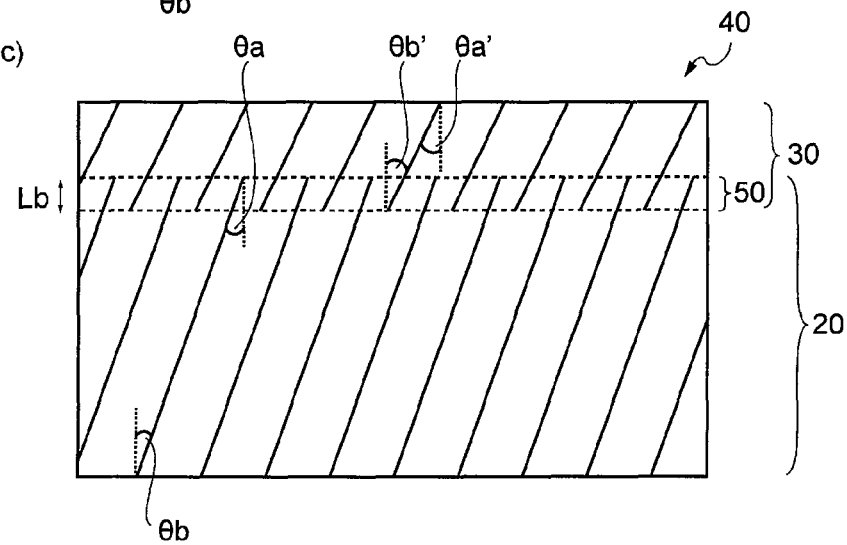

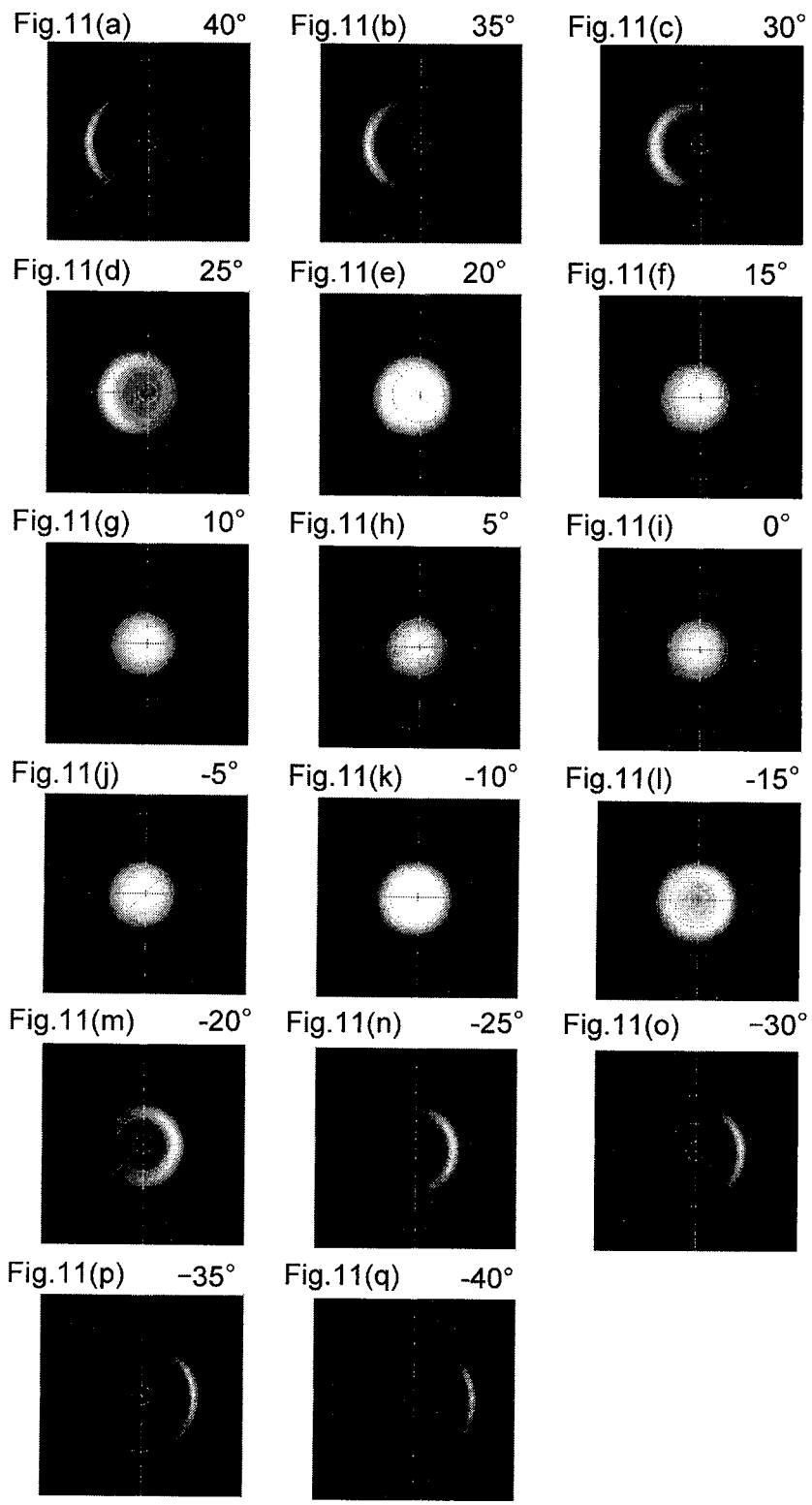

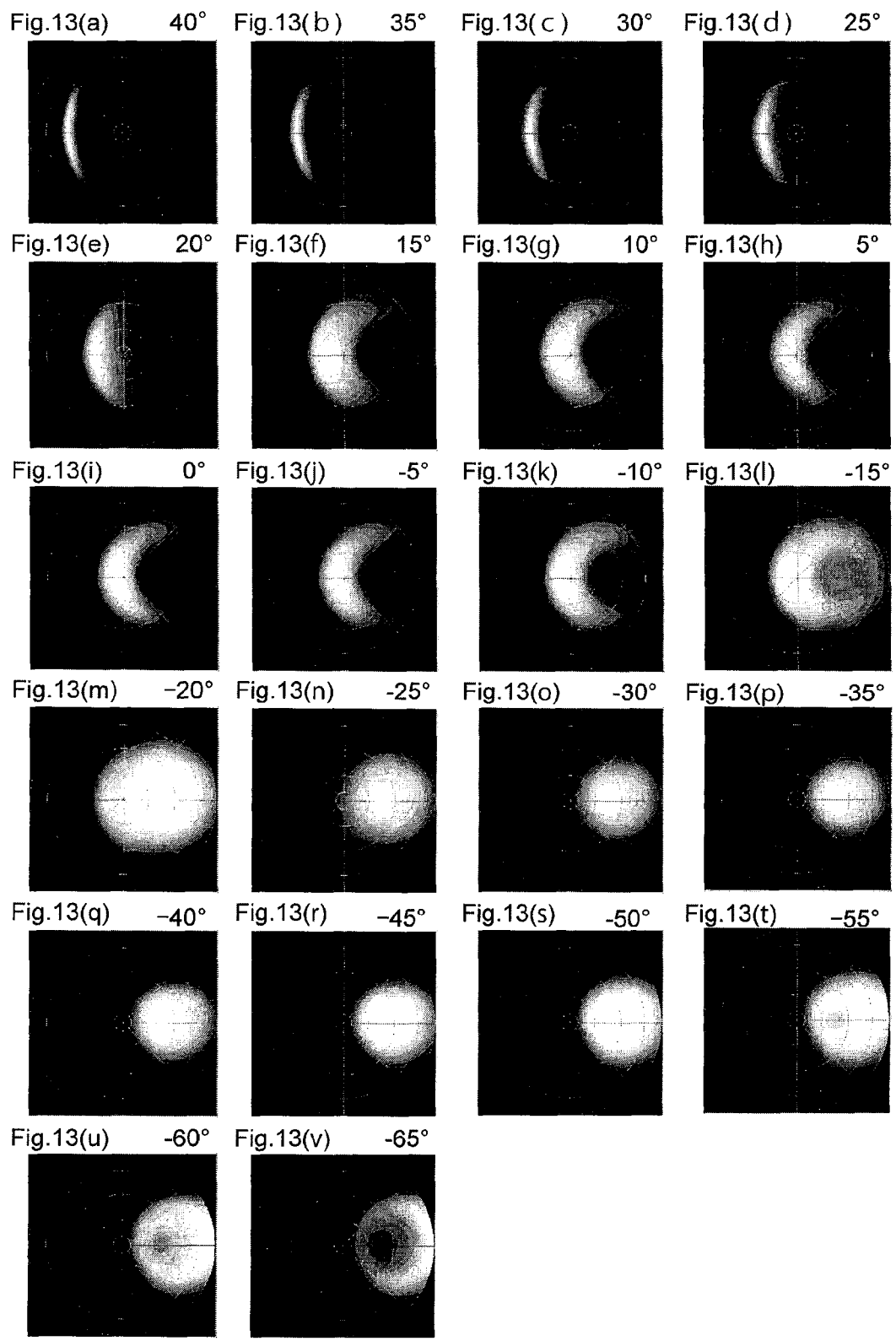

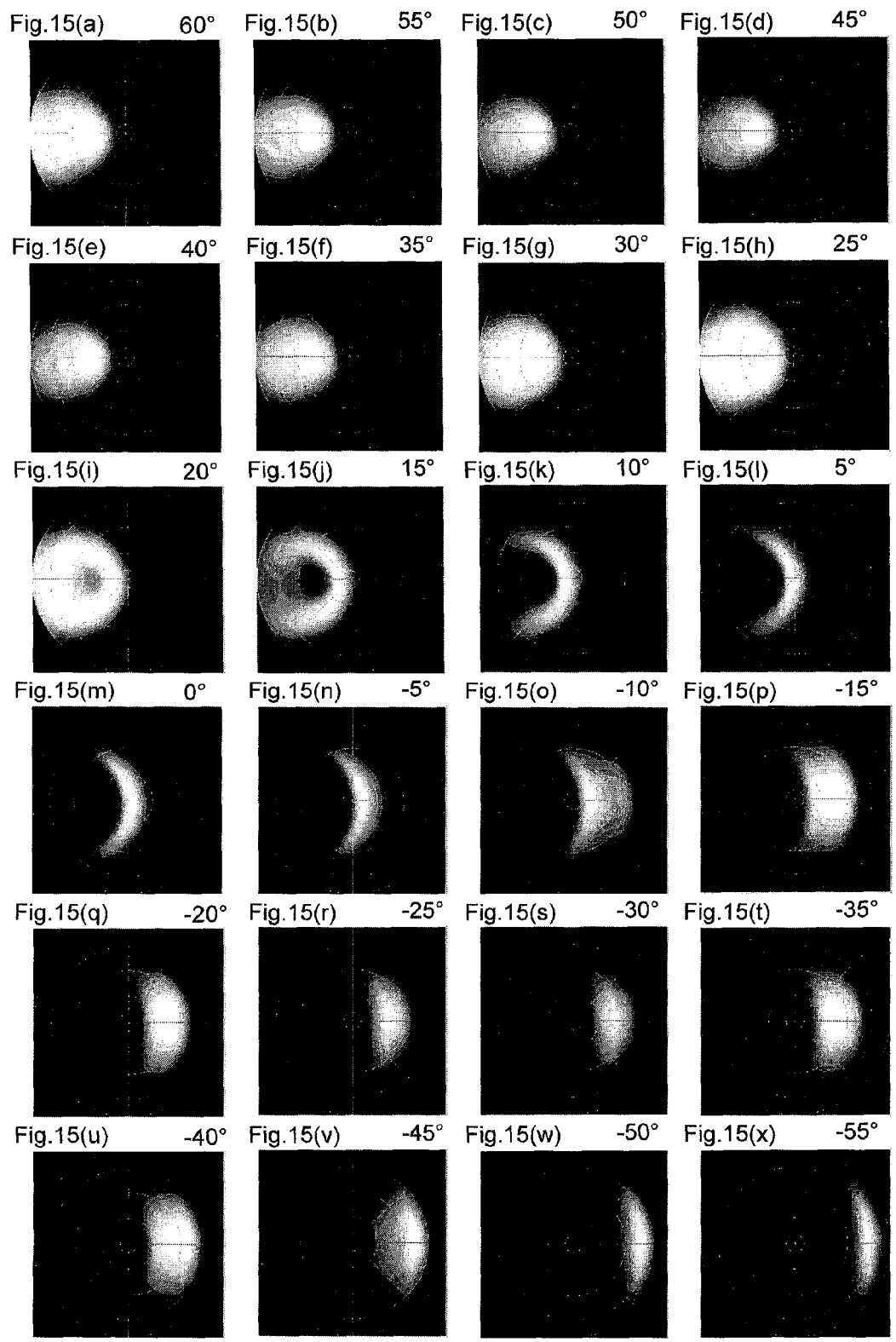

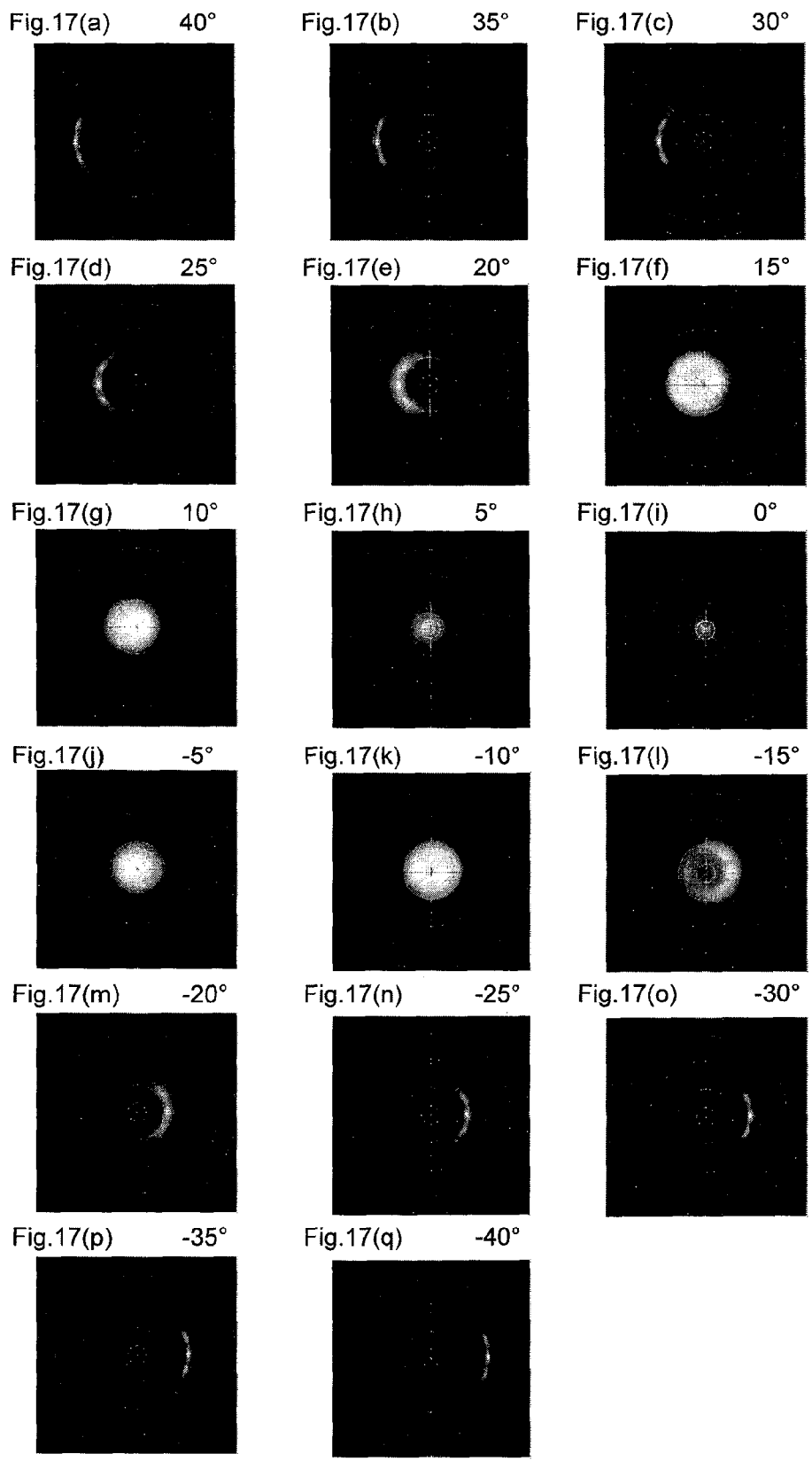

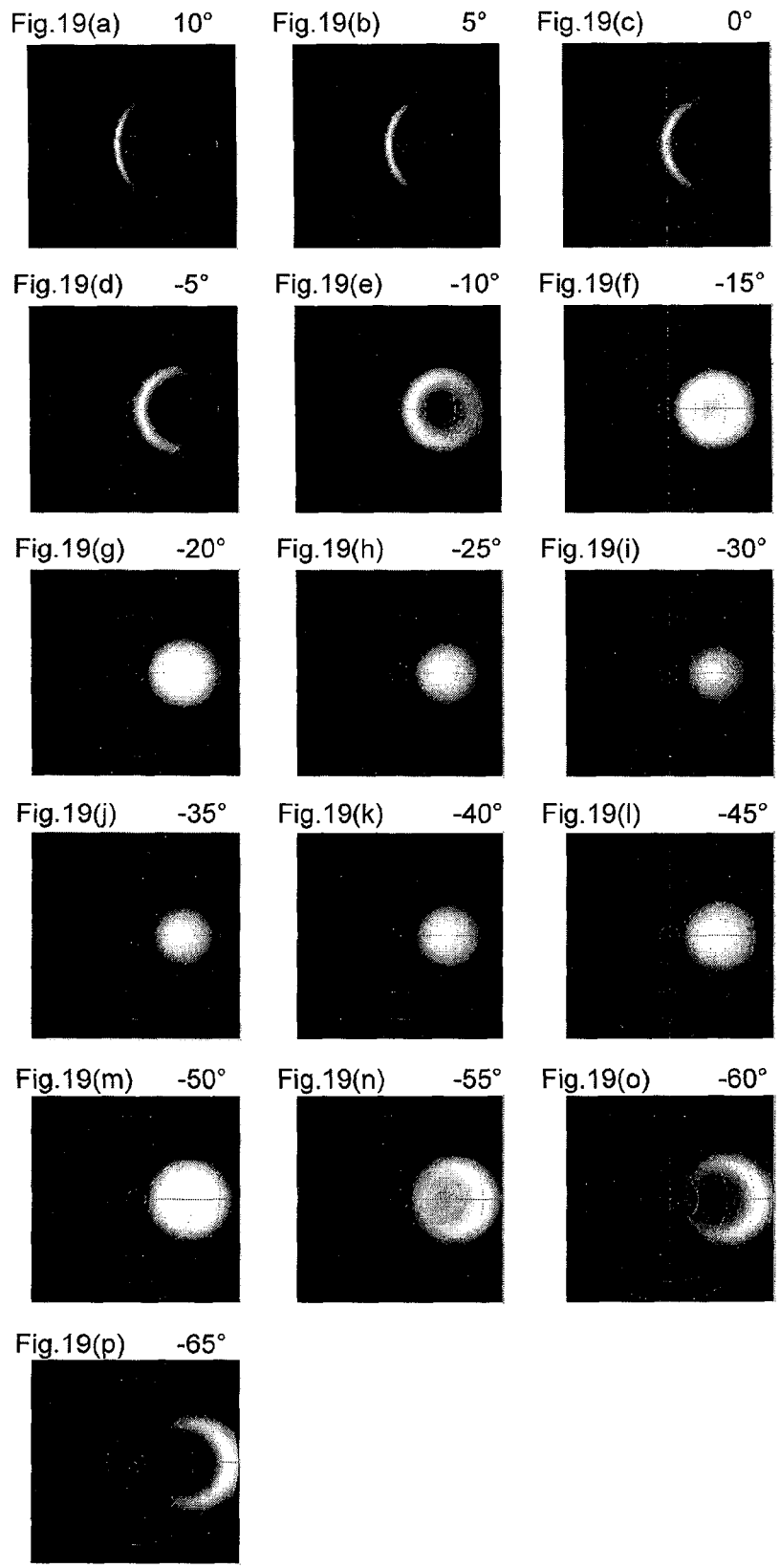

LIGHT DIFFUSION FILM AND LIGHT DIFFUSION FILM MANUFACTURING METHOD

TECHNICAL FIELD

The present invention relates to a light diffusion film and a method for manufacturing a light diffusion film.

More particularly, the present invention relates to a light diffusion film composed of a single layer, which is capable of increasing the uniformity of the intensity of diffused light in the light diffusion angle region, or effectively expanding the light diffusion angle region, by regulating the combination of the angles of inclination of pillar-shaped objects in plural columnar structure regions, and to a method for manufacturing a light diffusion film.

BACKGROUND ART

Conventionally, for example, in the field of optical technology to which liquid crystal display devices and the like belong, it has been suggested to use a light diffusion film which can diffuse an incident light coming from a particular direction into particular directions, while transmitting straight an incident light coming from any other directions.

A variety of forms of such a light diffusion film are known; however, in particular, light diffusion films having, within the films, a louver structure in which plural plate-shaped regions having different refractive indices are alternately arranged in one arbitrary direction along the film plane, have been widely used (for example, Patent Document 1).

Namely, Patent Document 1 discloses a method for manufacturing a light control plate (light diffusion film) which includes a first step of retaining on a film a resin composition composed of a plurality of compounds, each having one or more polymerizable carbon-carbon double bonds in their molecules and having a refractive index that is different from the refractive indices of the other compounds, irradiating the composition with ultraviolet radiation from a specific direction and thereby curing the resin composition; and a second step of retaining the resin composition on the film of the cured product thus obtained, irradiating with ultraviolet radiation from a direction different from that of the first step, and thereby curing the resin composition, characterized in that the second step is repeated if necessary.

On the other hand, regarding another type of light diffusion films, light diffusion films having, within the film, a columnar structure in which plural pillar-shaped objects having a relatively high refractive index are arranged to stand close together in a region having a relatively low refractive index, have been widely used (for example, Patent Documents 2 and 3).

Namely, Patent Document 2 discloses a manufacturing device by which a light control plate (light diffusion film) is formed by opposing a linear light source to a photocurable resin composition film, and, while either the photocurable resin composition film or the linear light source, or both are being moved, by irradiating the photocurable resin composition film with light from the linear light source, thereby curing the composition. The device for manufacturing a light control plate (light diffusion film) is a device in which the axial direction of the linear light source crosses the moving direction, and in which a plurality of light blocking thin plates opposed to one another are provided between the photocurable resin and the linear light source at a predetermined interval in a direction almost perpendicular to the moving direction, in such a fashion that one edge facing the photocurable resin composition of each of the light blocking thin plates is parallel to the moving direction.

Furthermore, Patent Document 3 discloses a method for manufacturing an anisotropic diffusion medium (light diffusion film), the method including providing a composition containing a photocurable compound into a sheet form, irradiating this sheet with parallel light rays from a predetermined direction P to cure the composition, and thereby forming an aggregate of plural rod-shaped cured regions that are extended in parallel to the direction P, within the sheet, characterized in that aggregates of tubular objects that are arranged in parallel to the direction P are interposed between a linear light source and the sheet, and light irradiation is performed through these tubular objects.

Furthermore, there has been suggested a light diffusion film having both the louver structure and the columnar structure described above, within the film (for example, Patent Document 4).

That is, Patent Document 4 discloses a light diffusion film having a first structural region for anisotropically diffusing incident light, and a second structural region for isotropically diffusing incident light, characterized in that the first structural region is a louver structure region in which plural plate-shaped regions having different refractive indices are arranged alternately in parallel along the direction of the film plane, and the second structural region is a columnar structure region in which plural pillar-shaped objects are arranged to stand close together in a medium, with the plural pillar-shaped objects having a refractive index different from that of the medium.

CITATION LIST

Patent Document

Patent Document 1: JP 63-309902 A (Claims)
Patent Document 2: JP 2009-173018 A (Claims)
Patent Document 3: JP 2005-292219 A (Claims)
Patent Document 4: JP 2012-141593 A (Claims)

DISCLOSURE OF THE INVENTION

Problem to be Solved by the Invention

However, the light diffusion film having a louver structure obtainable by the production method of Patent Document 1 has a problem that among the components included in incident light, the light diffusion film can sufficiently diffuse those components that are perpendicular to the louver structure that is extended in any one arbitrary direction along the film plane, but it is difficult for the light diffusion film to sufficiently diffuse those components parallel to the direction of the louver structure.

Therefore, for example, when the light diffusion film is used as a light control plate for a reflective type liquid crystal display device, a sufficient viewing angle may not be obtained with one sheet of light diffusion film, and therefore, there is a problem that plural sheets of the light diffusion film should be laminated.

Also, since a laminated structure in which plural louver structures are sequentially formed is used, the uniformity of the intensity of diffused light in the light diffusion angle region can be increased, or the light diffusion angle region can be expanded effectively; however, there is a problem that not only the production process is complicated, but also the film thickness is increased, so that blurring of images is liable to occur, or delamination is prone to occur.

Furthermore, although this is characteristic of anisotropic light diffusion caused by a louver structure, there is also a problem that sharp switching in the diffusion condition of light occurs between a light diffusion incident angle region and a non-light diffusion incident angle region.

On the other hand, the light diffusion film having a columnar structure that is obtainable by the production apparatus of Patent Document 2 or the production method of Patent Document 3, can isotropically diffuse incident light, unlike the case of Patent Document 1. However, since there is a single columnar structure in the film, there is a problem that the intensity of diffused light within the light diffusion angle region is liable to become non-uniform, or the light diffusion angle region is liable to be insufficient.

Therefore, for example, when the light diffusion film is used as a light control plate for a reflective type liquid crystal display device, expectably, a sufficient viewing angle may not be obtained with one sheet of light diffusion film, and therefore, there is a problem that plural sheets of light diffusion films should be laminated.

On the other hand, the light diffusion film having both a louver structure and a columnar structure as described in Patent Document 4, has a problem that sharp switching in the diffusion condition of light occurs between a light diffusion incident angle region and a non-light diffusion incident angle region.

Therefore, for example, in a case in which the light diffusion film is used as a light control plate for a reflective type liquid crystal display device, there is a problem that when the display device is slowly inclined with respect to incident light, the display undergoes sharp switching between light and shade, and a person viewing the display screen may have feelings of discomfort.

Thus, the inventors of the present invention conducted a thorough investigation in view of such circumstances as described above, and the inventors found that when a first columnar structure region and a second columnar structure region are formed in a same film, the uniformity of the intensity of diffused light in the light diffusion angle region can be increased, or the light diffusion angle region can be expanded effectively, thus completing the present invention.

That is, an object of the present invention is to provide a light diffusion film composed of a single layer which is capable of increasing the uniformity of the intensity of diffused light in the light diffusion angle region, or of effectively expanding the light diffusion angle region, by regulating the combination of the angles of inclination of pillar-shaped objects in plural columnar structure regions, and a method for manufacturing the light diffusion film.

Means for Solving Problem

According to the present invention, there is provided a light diffusion film having a single-layered light diffusion layer that has a first columnar structure region and a second columnar structure region, in which plural pillar-shaped objects having a relatively high refractive index are arranged to stand close together in a region having a relatively low refractive index, sequentially from the lower part of the film along the film thickness direction, and thus the problems described above can be solved.

That is, the light diffusion film of the present invention has a first columnar structure region and a second columnar structure region.

Therefore, the light diffusion angle region can be expanded effectively by varying the angles of inclination of the pillar-shaped objects included in the respective columnar structure regions.

On the other hand, when the angles of inclination of the pillar-shaped objects included in the respective columnar structural regions are overlapped, the contribution to the light diffusion angle region is small; however, the length of the pillar-shaped objects as a whole in the film thickness direction is extended stably. Therefore, the uniformity of the intensity of diffused light in the light diffusion angle region can be increased.

Furthermore, since the light diffusion film of the present invention has a first columnar structure region and a second columnar structure region in a single layer, the occurrence of delamination can be basically suppressed.

Furthermore, on the occasion of configuring the light diffusion film of the present invention, it is preferable that the light diffusion film has an overlapping columnar structure region in which the upper end of the first columnar structure region and the lower end of the second columnar structure region overlap with each other.

When such a configuration is adopted, the generation of scattered light in a columnar structure-unformed part between the respective columnar structure regions can be suppressed, and the uniformity of the intensity of diffused light within the light diffusion angle region can be further enhanced.

Furthermore, on the occasion of configuring the light diffusion film of the present invention, it is preferable that the overlapping columnar structure region is formed as the tips of any one side of the pillar-shaped objects respectively originating from the first columnar structure region and the second columnar structure region, are brought into contact with the vicinity of the tips of the pillar-shaped objects originating from the columnar structure region of the other side.

When such a configuration is adopted, columnar structures can be arranged efficiently in a limited film thickness, so that the uniformity of the intensity of diffused light in the light diffusion angle region can be enhanced, and the light diffusion angle region can be expanded more effectively.

Furthermore, on the occasion of configuring the light diffusion film of the present invention, it is preferable that the thickness of the overlapping columnar structure region is adjusted to a value within the range of 1 to 40 µm.

When such a configuration is adopted, the generation of scattered light in the overlapping portion of the first columnar structure region and the second columnar structure region in the overlapping columnar structure region can be suppressed, and the uniformity of the intensity of diffused light in the light diffusion angle region can be maintained more stably.

Furthermore, on the occasion of configuring the light diffusion film of the present invention, it is preferable that the thickness of the overlapping columnar structure region is adjusted to a value within the range of 0.1% to 10% of the film thickness (100%).

When such a configuration is adopted, the overlapping condition of the first columnar structure region and the second columnar structure region in the overlapping columnar structure region can be adjusted to a more satisfactory extent. Therefore, the generation of scattered light in the overlapping portion of the respective columnar structure regions can be suppressed, and the uniformity of the intensity of diffused light in the light diffusion angle region can be maintained more stably.

Furthermore, on the occasion of configuring the light diffusion film of the present invention, it is preferable that the absolute value of the difference between the angles of inclination of the pillar-shaped objects respectively originating from the first columnar structure region and the second columnar structure region in the overlapping columnar structure region, is adjusted to a value of 1° or more.

When such a configuration is adopted, the light diffusion angle region can be expanded more effectively.

Furthermore, on the occasion of configuring the light diffusion film of the present invention, it is preferable that a main component of the pillar-shaped objects in the first columnar structure region and the second columnar structure region is a (meth)acrylic acid ester polymer containing plural aromatic rings, and a main component of the region having a relatively low refractive index is a urethane (meth)acrylate.

When such a configuration is adopted, the first and second columnar structure regions can be formed in a more well-defined manner.

Furthermore, another aspect of the present invention relates to a method for manufacturing a light diffusion film, the method including the following steps (a) to (d):

(a) a step of preparing a composition for light diffusion film;

(b) a step of applying the composition for light diffusion film on a process sheet, and forming a coating layer;

(c) a step of subjecting the coating layer to first active energy ray irradiation, forming a first columnar structure region in the lower portion of the coating layer, and simultaneously leaving a columnar structure-unformed region in the upper portion of the coating layer; and (d) a step of subjecting the coating layer to second active energy ray irradiation, and forming a second columnar structure region in the columnar structure-unformed region.

That is, when the method for manufacturing a light diffusion film of the present invention is used, since a coating layer formed from a predetermined composition for light diffusion film is subjected to first and second active energy ray irradiation, the combination of the angles of inclination of pillar-shaped regions in the first and second columnar structure regions can be regulated easily.

Furthermore, since the first and second columnar structure regions are formed in a single layer, the occurrence of delamination in the light diffusion film thus obtained can be basically suppressed.

Furthermore, on the occasion of carrying out the method for manufacturing a light diffusion film of the present invention, it is preferable that the first active energy ray irradiation is carried out in an oxygen-containing atmosphere, and also, the second active energy ray irradiation is carried out in a non-oxygen atmosphere.

When the method is carried out as such, a columnar structure-unformed region can be formed stably in the upper portion of the coating layer by utilizing the influence of oxygen inhibition, while forming a first columnar structure region efficiently in the lower portion of the coating layer.

On the other hand, in the columnar structure-unformed region thus obtained, the influence of oxygen inhibition can be suppressed, and thereby the second columnar structure region can be formed efficiently.

BRIEF DESCRIPTION OF DRAWINGS

FIGS. 2(a) and 2(b) are diagrams provided to explain the incident angle dependency, isotropic light diffusion, and the angle of aperture in a light diffusion film having a columnar structure in the film.

FIGS. 6(a) to 6(c) are diagrams provided to explain the overlapping columnar structure region.

FIGS. 11(a) to 11(q) are diagrams provided to explain the light diffusion characteristics of the light diffusion film of Example 1.

FIGS. 13(a) to 13(v) are diagrams provided to explain the light diffusion characteristics of the light diffusion film of Example 2.

FIGS. 15(a) to 15(x) are diagrams provided to explain the light diffusion characteristics of the light diffusion film of Example 3.

FIGS. 17(a) to 17(q) are diagrams provided to explain the light diffusion characteristics of the light diffusion film of Comparative Example 1.

FIGS. 19(a) to 19(p) are diagrams provided to explain the light diffusion characteristics of the light diffusion film of Comparative Example 2.

MODE(S) FOR CARRYING OUT THE INVENTION

First Embodiment

A first embodiment of the present invention relates to a light diffusion film having a single-layered light diffusion layer including a first columnar structure region and a second columnar structure region, in which plural pillar-shaped objects having a relatively high refractive index are arranged to stand close together in a region having a relatively low refractive index, sequentially from the lower part of the film along the film thickness direction.

Hereinafter, the light diffusion film as the first embodiment of the present invention will be explained specifically with appropriate reference to the drawings.

1. Basic Principles of Light Diffusion in Light Diffusion Film

First of all, the basic principles of light diffusion in a light diffusion film will be explained using FIGS. 1 and 2.

Figure 1A:
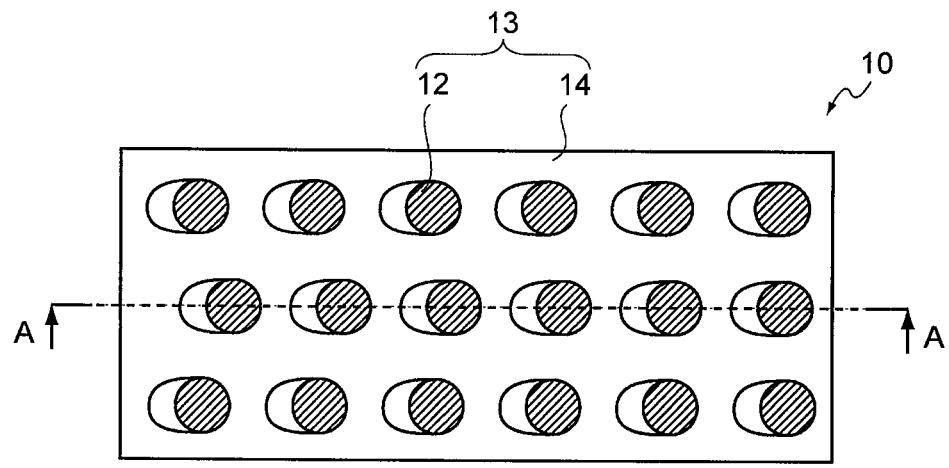
FIGS. 1(a) and 1(b) are diagrams provided to explain an outline of the light diffusion film having a columnar structure in the film.
Figure 1B:
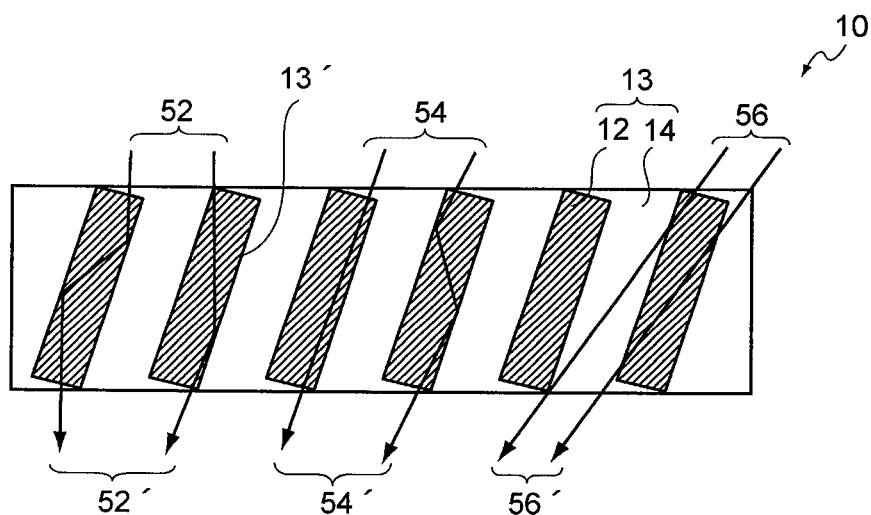

First, FIG. 1(a) shows a top view (plan view) of a light diffusion film 10, and FIG. 1(b) shows a cross-sectional view of the light diffusion film 10 in a case in which the light diffusion film 10 shown in FIG. 1(a) is cut in a perpendicular direction along the dotted line A-A, and the cut surface is viewed from the direction indicated by the arrow.

Furthermore, FIG. 2(a) shows an overall view of the light diffusion film 10, and FIG. 2(b) shows a cross-sectional view in the case of viewing the light diffusion film 10 of FIG. 2(a) from the X-direction.

As illustrated in such a plan view of FIG. 1(a), the light diffusion film 10 has a columnar structure 13 composed of pillar-shaped objects having a relatively high refractive index 12, and a region having a relatively low refractive index 14.

Furthermore, as illustrated in the cross-sectional view of FIG. 1(b), in the vertical direction of the light diffusion film 10, the pillar-shaped objects having a relatively high refractive index 12 and the region having a relatively low refractive index 14 respectively have a predetermined width, and are thereby in a state of being alternately arranged.

Thereby, as illustrated in FIG. 2(a), it is speculated that when the incident angle is within the light diffusion incident angle region, incident light is diffused by the light diffusion film 10.

That is, as illustrated in FIG. 1(b), it is speculated that when the incident angle of light entering the light diffusion film 10 has a value in a predetermined angle range from parallel, that is, a value within the light diffusion incident angle region, with respect to the boundary surface 13' of the columnar structure 13, incident light (52, 54) escapes through the interior of the pillar-shaped objects 12 having a relatively high refractive index in the columnar structure along the film thickness direction while changing the direction, and thereby the direction of propagation of light on the light exit surface side becomes uneven.

As a result, when the incident angle is within the light diffusion incident angle region, incident light is diffused by the light diffusion film 10 and becomes diffused light (52', 54').

On the other hand, in a case in which the incident angle of light entering the light diffusion film 10 is shifted away from the light diffusion incident angle region, it is speculated that, as illustrated in FIG. 1(b), incident light 56 directly transmitted by the light diffusion film 10, without being diffused by the light diffusion film, and becomes transmitted light 56'.

Meanwhile, in the present invention, the term "light diffusion incident angle region" means, with respect to the light diffusion film, the range of angles of incident light corresponding to the emission of a diffused light, when the angle of incident light is changed from a point light source.

Also, such a "light diffusion incident angle region" is an angle region determined for each light diffusion film, as shown in FIG. 2(a), based on the difference in refractive index, the angle of inclination and the like of columnar structures in the light diffusion film.

Owing to the basic principles described above, the light diffusion film 10 having a columnar structure 13 can exhibit, for example, incident angle dependency in transmission and diffusion of light, as illustrated in FIG. 2(a).

Furthermore, as illustrated in FIG. 1 and FIG. 2, a light diffusion film having the columnar structure 13 usually exhibits "isotropy".

Here, the term "isotropy" as used in the present invention means that, as illustrated in FIG. 2(a), when incident light is diffused by a film, the diffusion condition (shape of diffusion of diffused light) of the emitted light that has been diffused in a plane parallel to the film has a property of not changing with the direction in the same plane.

More specifically, as illustrated in FIG. 2(a), when incident light is diffused by the film, the diffusion condition of emitted light that has been diffused is circular in a plane parallel to the film.

Also, as illustrated in FIG. 2(b), when the term "incident angle θ1" of incident light is used in the present invention, the incident angle θ1 means the angle (°) obtainable in a case in which the angle of the normal line to the incident side surface of the light diffusion film is designated as 0°.

Furthermore, in the present invention, the "light diffusion angle region" means the range of angles of the diffused light obtained by fixing a point light source at an angle for which the incident light is the most diffused.

Furthermore, according to the present invention, the term "angle of aperture of diffused light" is the width of angle (°) of the "light diffusion angle region" described above, and as illustrated in FIG. 2(b), means the angle of aperture of diffused light θ2 in a case in which a cross-section of the film is viewed from the direction indicated by the arrow X.

Meanwhile, it has been recognized that the width of angle (°) of the light diffusion angle region and the width of the light diffusion incident angle region are approximately equal.

Furthermore, as illustrated in FIG. 2(a), in a light diffusion film, when incident angles of incident light are included in the light diffusion incident angle region, even if the incident angles are different, almost the same light diffusion can be achieved in the light exist surface side.

Therefore, it can be said that the resulting light diffusion film has a light-converging effect of concentrating light into a predetermined site.

Meanwhile, regarding the change of direction of incident light in the interior of pillar-shaped objects 12, the case in which the change of direction is of step-index type, with the direction being changed from a straight line form to a zigzag form due to total reflection as illustrated in FIG. 1(b), as well as the case in which the change of direction is of gradient-index type, with the direction being changed to a curved from, may be considered.

Furthermore, in FIGS. 1(a) and 1(b), the boundary surface between the pillar-shaped objects having a relatively high refractive index 12 and the region having a relatively low refractive index 14 is indicated with a straight line for the purpose of simplicity; however, in reality, the interface is slightly meandering, and each of the pillar-shaped objects forms a complicated refractive index distribution structure accompanied by branching or disappearance.

As a result, it is speculated that a non-even distribution of optical characteristics increases light diffusibility.

2. Basic Configuration

Next, the basic configuration of the light diffusion film of the present invention will be explained using the drawings.

Figure 3A:
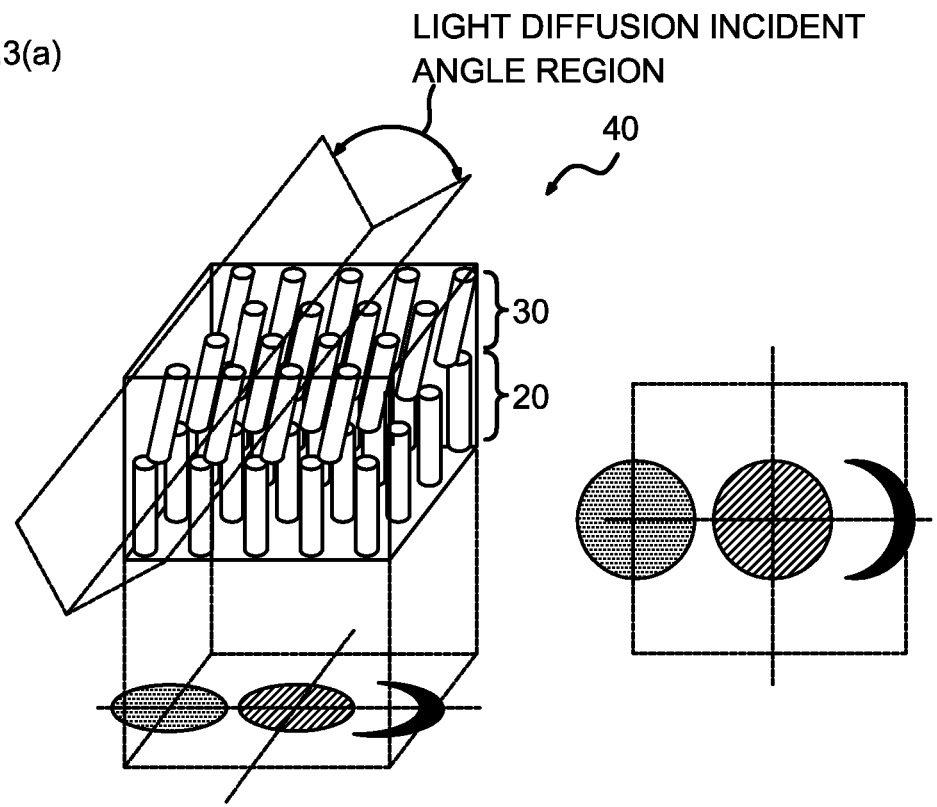
FIGS. 3(a) and 3(b) are diagrams provided to explain the incident angle dependency and the angle of aperture in the light diffusion film of the present invention.
Figure 3B:
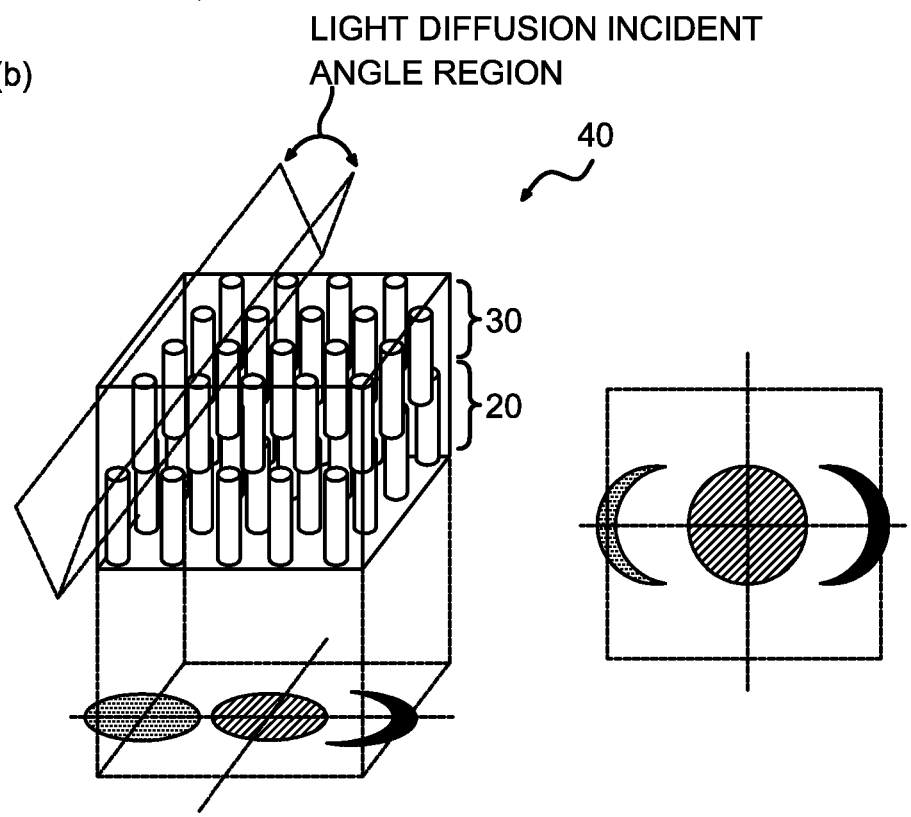

As illustrated in FIGS. 3(a) and 3(b), the light diffusion film 40 of the present invention is characterized by including a first columnar structure region 20 and a second columnar structure region 30 in the same film, sequentially from the lower part of the film along the film thickness direction.

Therefore, in the light diffusion film of the present invention, for example, as illustrated in FIG. 3(a), the light diffusion angle region and the light diffusion incident angle region can be expanded effectively by varying the angles of inclination of the pillar-shaped objects included in the respective columnar structure regions.

On the other hand, as illustrated in FIG. 3(b), when the angles of inclination of the pillar-shaped objects included in the respective columnar structure regions are overlapped, the contribution to the expansion of the light diffusion angle region is small; however, the length of the pillar-shaped objects as a whole in the film thickness direction is extended stably. Therefore, the uniformity of the intensity of diffused light in the light diffusion angle region can be enhanced efficiently.

Meanwhile, the term "lower part" described above means, when a coating layer is provided on a process sheet, the side closer to the process sheet in the film thickness direction of the coating layer. Therefore, the term is a term used for convenience in the explanation of the present invention, and is not intended to limit the up and down directions of the light diffusion film itself.

Figure 4A:
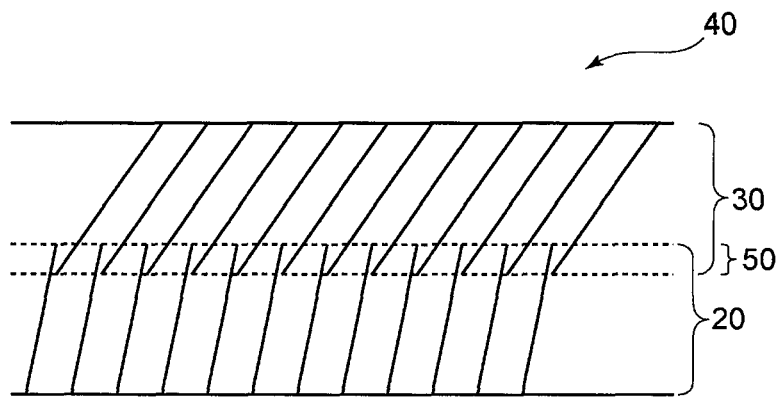
FIGS. 4(a) to 4(c) are diagrams provided to explain embodiments of the light diffusion film of the present invention.
Figure 4B:
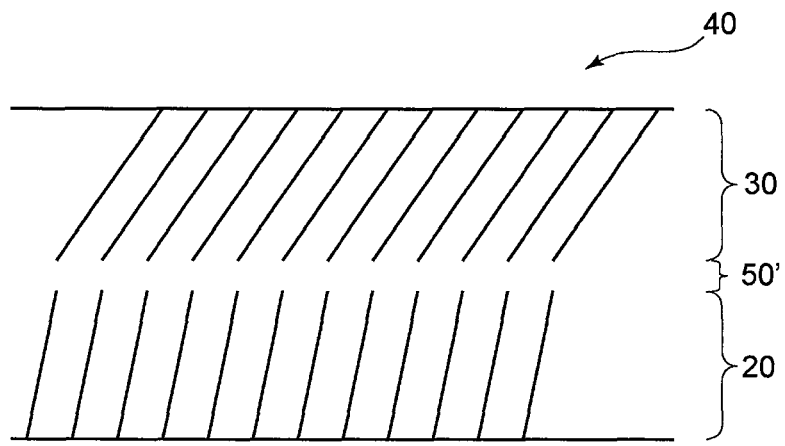

Furthermore, the light diffusion film of the present invention can adopt the embodiments illustrated in FIGS. 4(a) and 4(b).

That is, a first embodiment is a light diffusion film 40 having, as illustrated in FIG. 4(a), an overlapping columnar structure region 50 in which the upper end of a first columnar structure region 20 and the lower end of a second columnar structure region 30 overlap with each other.

Furthermore, a second embodiment is a light diffusion film 40 in which, as illustrated in FIG. 4(b), at the interface between a first columnar structure region 20 and a second columnar structure region 30, there exists a gap portion 50' where a columnar structure is not formed, or the first columnar structure region 20 and the second columnar structure region 30 are in exact contact.

Figure 4C:
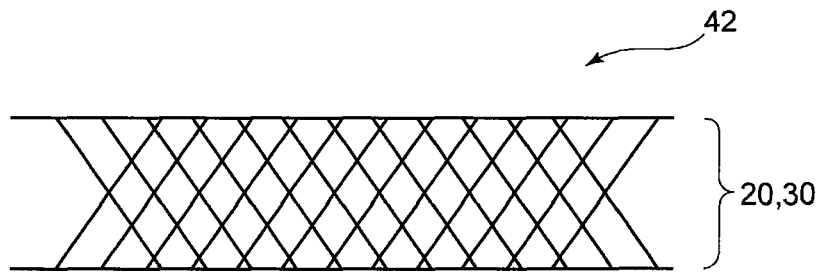

On the other hand, as illustrated in FIG. 4(c), a light diffusion film 42 in which two columnar structure regions (20, 30) existing in the interior of the film are excessively overlapping with each other, is not included in the light diffusion film of the present invention.

In this regard, since the light diffusion film of the present invention is characterized by having two columnar structure regions in the same film, it is indeed essential in the production method to carry out active energy ray irradiation in two stages on a single coating layer formed from a composition for light diffusion film.

It is because in such a production method, the light diffusion film 42 illustrated in FIG. 4(c) may not be obtained.

Furthermore, in the light diffusion film 42, since the difference in refractive index between the pillar-shaped objects and the surrounding areas is extremely small, the effects of the present invention of increasing the uniformity of the intensity of diffused light or effectively expanding the light diffusion angle region may not be sufficiently obtained.

3. First Columnar Structure Region

The light diffusion film of the present invention is characterized by having a first columnar structure region in which plural pillar-shaped objects having a relatively high refractive index are arranged to stand close together in a region having a relatively low refractive index.

The first columnar structure region will be specifically explained below using the drawings.

Meanwhile, in FIG. 5, in order to simplify the explanation, any one of the first columnar structure region or the second columnar structure region is extracted and presented. Therefore, the expression "20 (30)" in FIG. 5 is meant to represent any one of the first columnar structure region 20 or the second columnar structure region 30 in FIG. 3.

(1) Refractive Index

In regard to the columnar structure region, it is preferable that the difference between the refractive index of the pillar-shaped objects having a relatively high refractive index and the refractive index of the region having a relatively low refractive index is adjusted to a value of 0.01 or more.

The reason for this is that when such a difference in the refractive index is adjusted to a value of 0.01 or more, incident light can be reflected stably within the columnar structure region, and the incident angle dependency and the angle of aperture of diffused light can be further enhanced.

That is, it is because if such a difference in the refractive index has a value of below 0.01, since the angle range in which incident light undergoes total reflection in the columnar structure region is narrowed, the incident angle dependency may be excessively decreased, or the angle of aperture of diffused light may be excessively narrowed.

Therefore, it is more preferable that the difference between the refractive index of the pillar-shaped objects having a relatively high refractive index and the refractive index of the region having a relatively low refractive index in the columnar structure region is adjusted to a value of 0.05 or more, and even more preferably to a value of 0.1 or more.

Meanwhile, it is more preferable if the difference in the refractive index is larger; however, from the viewpoint of appropriately selecting the material capable of forming the columnar structure region, a value of about 0.3 may be considered as the upper limit.

(2) Maximum Diameter

Figure 5A:
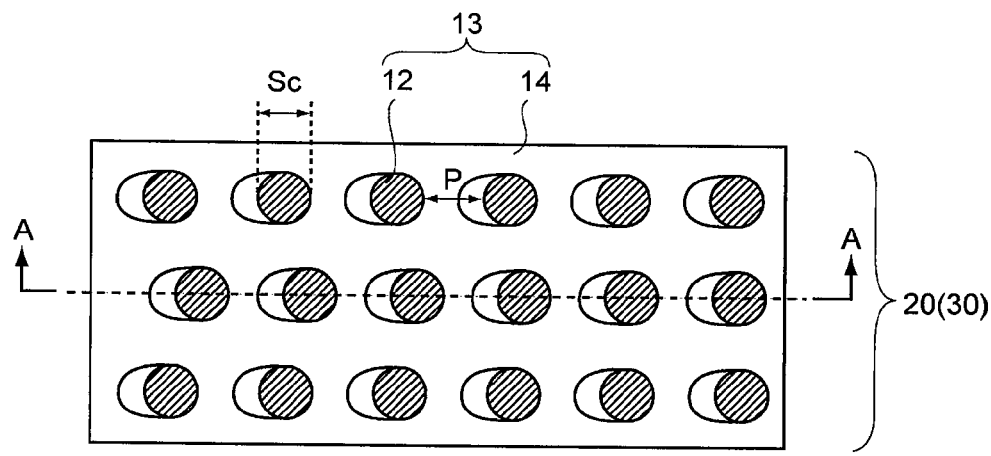
FIGS. 5(a) to 5(c) are diagrams provided to explain embodiments of the columnar structure region.

Furthermore, as illustrated in FIG. 5(a), it is preferable that in the columnar structure region, the maximum diameter Sc in a cross-section of a pillar-shaped object is adjusted to a value within the range of 0.1 to 15 μm.

The reason for this is that, when such a maximum diameter is adjusted to a value within the range of 0.1 to 15 μm, incident light can be reflected more stably in the columnar structure region, and the incident angle dependency and the angle of aperture of diffused light can be further enhanced.

That is, it is because if such a maximum diameter has a value of below 0.1 μm, it may be difficult to exhibit light diffusibility, irrespective of the incident angle of incident light. On the other hand, if such a maximum diameter has a value of above 15 μm, the amount of light that propagates straight through the columnar structure region increases, and the uniformity of light diffusion may be deteriorated.

Therefore, in regard to the columnar structure region, it is more preferable that the maximum diameter in a cross-section of a pillar-shaped object is adjusted to a value within the range of 0.5 to 10 μm, and even more preferably to a value within the range of 1 to 5 μm.

Meanwhile, the cross-sectional shape of the pillar-shaped object is not particularly limited; however, it is preferable to use, for example, a circular shape, an elliptical shape, a polygonal shape, or an irregular shape.

Also, a cross-section of a pillar-shaped object means a cross-section obtained by cutting the pillar-shaped object at a plane parallel to the film surface.

Meanwhile, the maximum diameter, length and the like of the pillar-shaped object can be calculated by observing the pillar-shaped object using an opto-digital microscope.

(3) Thickness

Figure 5B:
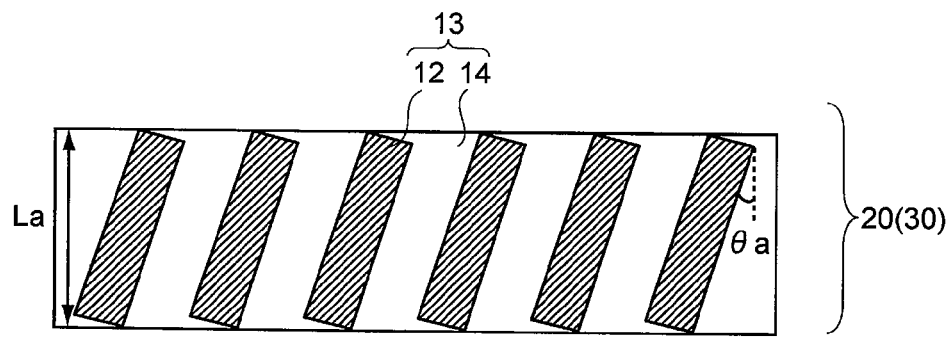

Furthermore, as illustrated in FIG. 5(b), it is preferable that the thickness (length) La of the pillar-shaped objects in the columnar structure region is adjusted to a value within the range of 30 to 500 μm.

The reason for this is that, if such a thickness has a value of below 30 μm, because the thickness of the pillar-shape objects is insufficient, the amount of incident light that propagates straight through the columnar structure region increases, and it may be difficult to obtain sufficient incident angle dependency and a sufficient angle of aperture of diffused light. On the other hand, it is because, if such a thickness has a value of above 500 μm, when the columnar structure region is formed by irradiating a composition for light diffusion film with active energy radiation, the direction of progress of photopolymerization is diffused by the columnar structure initially formed, and it may be difficult to form a desired columnar structure region.

Therefore, it is more preferable that the thickness of the pillar-shaped objects in the columnar structure region is adjusted to a value within the range of 50 to 300 μm, and even more preferably to a value within the range of 70 to 200 μm.

(4) Distance Between Pillar-Shaped Objects

Furthermore, as illustrated in FIG. 5(a), it is preferable that the distance between pillar-shaped objects, that is, the space P between adjacent pillar-shaped objects, in the columnar structure region is adjusted to a value within the range of 0.1 to 15 μm.

The reason for this is that when such a distance is adjusted to a value within the range of 0.1 to 15 μm, incident light can be reflected more stably in the columnar structure region, and the incident angle dependency and the angle of aperture of diffused light can be further enhanced.

That is, it is because if such a distance has a value of below 0.1 μm, it may be difficult to exhibit light diffusibility irrespective of the incident angle of incident light. On the other hand, it is because if such a distance has a value of above 15 μm, the amount of light that propagates straight through the columnar structure region increases, and the uniformity of light diffusion may be deteriorated.

Therefore, in the columnar structure region, it is more preferable that the distance between pillar-shaped objects is adjusted to a value within the range of 0.5 to 10 μm, and even more preferably to a value within the range of 1 to 5 μm.

(5) Angle of Inclination

Furthermore, as illustrated in FIG. 5(b), it is preferable that in the columnar structure region, pillar-shaped objects 12 are arranged to stand close together at a constant angle of inclination θa with respect to the film thickness direction.

The reason for this is that, when the angle of inclination of the pillar-shaped objects is made constant, incident light can be reflected more stably in the columnar structure region, and the incident angle dependency and the angle of aperture of diffused light can be further enhanced.

Figure 5C:
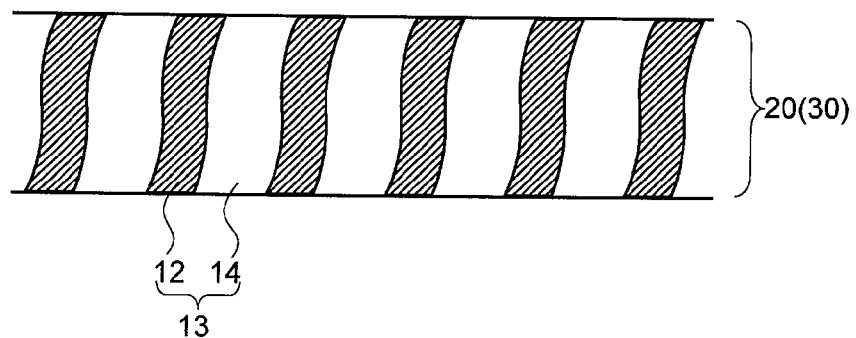

Furthermore, as illustrated in FIG. 5(c), it is also preferable that the pillar-shaped objects are bent.

The reason for this is that when the pillar-shaped objects are bent, the amount of incident light that propagates straight through the columnar structure region can be decreased, and the uniformity of light diffusion can be enhanced.

Meanwhile, such bent pillar-shaped objects can be obtained by irradiating light while changing the angle of irradiation of irradiated light when active energy ray irradiation is performed; however, such bent pillar-shaped objects are also largely dependent on the kind of the material that forms the columnar structure region.

Furthermore, θa means the angle of inclination (°) of a pillar-shaped object in a case in which the angle of the normal line with respect to the film surface, which is measured at a cross-section obtainable when the film is cut by a plane that is a plane perpendicular to the film plane and cuts one whole pillar-shaped object into two along the axial line is designated as 0° (narrower angle between the angles formed by the normal line and the pillar-shaped object). Meanwhile, the angle of inclination in the case in which the pillar-shaped objects are inclined to the right side as illustrated in FIG. 5(b) is taken as the reference, and the angle of inclination in the case in which the pillar-shaped objects are inclined to the left side is described with a minus sign.

4. Second Columnar Structure Region

The light diffusion film of the present invention is characterized b having a second columnar structure region in which plural-pillar-shaped objects having a relatively high refractive index are arranged to stand close together in a region having a relatively low refractive index.

Meanwhile, since the configuration of the second columnar structure region is basically the same as the configuration of the first columnar structure region, specific details will not be repeated here.

However, from the viewpoint that the second columnar structure region accomplishes a role as an auxiliary of the first columnar structure region in light diffusion, it is preferable that the thickness is adjusted to a value within the range of 10 to 200 μm, more preferably to a value within the range of 20 to 150 μm, and even more preferably to a value within the range of 40 to 100 μm.

Furthermore, it is preferable that the value obtained by subtracting the thickness of the overlapping columnar structure region that will be described below, from the sum of the thicknesses of the first columnar structure region and the second columnar structure region, is adjusted to a value of 80% or more relative to the film thickness (100%).

The reason for this is that, when the proportion occupied by the sum of the regions in which columnar structures are formed with respect to the entirety of the film is adjusted to a value within such a range, the uniformity of the intensity of diffused light in the light diffusion angle region originating from the first columnar structure region and the second columnar structure region can be enhanced more effectively.

That is, it is because if the proportion occupied by the sum of the regions in which columnar structures are formed with respect to the entirety of the film has a value of below 80%, the absolute amount of the columnar structure is insufficient, and it may be difficult to obtain sufficient uniformity of the intensity of diffused light in the light diffusion angle region.

On the other hand, since a higher proportion occupied by the sum of the regions in which columnar structures are formed with respect to the entirety of the film, is more preferred, the upper limit is 100%.

However, when stable reproducibility or the like is considered, the upper limit is preferably about 98%.

5. Overlapping Columnar Structure Region

It is preferable that the light diffusion film of the present invention has an overlapping columnar structure region in which the upper end of a first columnar structure region and the lower end of a second columnar structure region overlap with each other.

The reason for this is that when the light diffusion film has an overlapping columnar structure region, uniformization of the intensity of diffused light in the light diffusion angle region can be realized efficiently for a limited film thickness.

Hereinafter, the overlapping columnar structure region will be explained specifically.

(1) Configuration

The overlapping columnar structure region 50 is not particularly limited as long as it is formed by the upper end of the first columnar structure region 20 and the lower end of the second columnar structure region 30 overlapping with each other.

More specifically, as illustrated in FIGS. 6(a) and 6(b), it is preferable that the overlapping columnar structure region is an overlapping columnar structure region 50 in which the tip of any one of the first columnar structure region 20 and the second columnar structure region 30 is in contact with the vicinity of the tips of the pillar-shaped objects originating from the other columnar structure region.

Alternatively, as illustrated in FIG. 6(c), an overlapping columnar structure region 50 in which the respective pillar-shaped objects originating from the first columnar structure region 20 and the second columnar structure region 30 are overlapping in a non-contact state, is also preferred.

(2) Different in Angle of Inclination

Furthermore, it is preferable that the absolute value of the difference between the angles of inclination of the pillar-shaped objects respectively originating from the first columnar structure region and the second columnar structure region is adjusted to a value of 1° or more.

That is, as illustrated in FIG. 6(a), it is preferable that the absolute value of the difference between the angle of inclination θa of the pillar-shaped objects originating from the first columnar structure region and the angle of inclination θb' of the pillar-shaped objects originating from the second columnar structure region is adjusted to a value of 1° or more.

The reason for this is that the light diffusion angle region can be expanded more effectively by adjusting the absolute value of such a difference in the angle of inclination to a value of 1° or more.

On the other hand, if the absolute value of such a difference in the angle of inclination has an excessively large value, the diffused light attributable to the various columnar structure regions of the light diffusion film thus obtainable becomes completely independent of each other, and efficient expansion of the light diffusion angle region may not be achieved.

Therefore, it is more preferable that the absolute value of the difference between the angle of inclination θa of the pillar-shaped objects originating from the first columnar structure region and the angle of inclination θb' of the pillar-shaped objects, is adjusted to a value within the range of 2° to 30°, and even more preferably to a value within the range of 5° to 20°.

Meanwhile, θa and θb' mean the angles of inclination (°) of pillar-shaped objects when the angle of the normal line with respect to the film surface, which is measured at a cross-section in a case in which the film is cut by a plane that is a plane perpendicular to the film plane and cuts one whole pillar-shaped object into two along the axial line, is designated as 0°.

More specifically, as illustrated in FIGS. 6(a) to 6(c), θa means the narrower angle between the angles formed by the normal line of the upper end surface of the first columnar structure region and the top of the pillar-shaped objects.

Furthermore, θb' means the narrower angle between the angles formed by the normal line of the lower end surface of the second columnar structure region and the bottom of the pillar-shaped objects.

Also, the angle of inclination in the case in which the pillar-shaped objects are inclined to the right side as illustrated in FIGS. 6(a) to 6(c) is taken as the reference, and the angle of inclination in the case in which the pillar-shaped objects are inclined to the left side is described with a minus sign.

Meanwhile, as illustrated in FIGS. 6(a) to 6(c), θb means the narrower angle between the angles formed by the normal line of the lower end surface of the first columnar structure region and the bottom of the pillar-shaped objects, and θa' means the narrower angle between the angles formed by the normal line of the upper end surface of the second columnar structure region and the top of the pillar-shaped objects.

Furthermore, it is preferable that the absolute value of the angle of inclination of the pillar-shaped objects originating from the second columnar structure region has a larger value than the absolute value of the angle of inclination of pillar-shaped objects having a different refractive index, which originate from the first columnar structure region.

The reason for this is that, when such a configuration is adopted, pillar-shaped objects having a sufficient length along the film thickness direction can be obtained in the second columnar structure region that is relatively difficult to form compared to the first columnar structure region, and the light diffusion angle region can be expanded more effectively.

(3) Thickness

Furthermore, it is preferable that the thickness Lb of the overlapping columnar structure region is adjusted to a value within the range of 1 to 40 μm.

The reason for this is that, when the thickness Lb of the overlapping columnar structure region is adjusted to a value within such a range, the overlapping condition of the first columnar structure region and the second columnar structure region in the overlapping columnar structure region can be adjusted to a suitable range, and therefore, the generation of scattered light in the connection part of the respective columnar structure regions can be suppressed, while the uniformity of the intensity of diffused light in the light diffusion angle region can be maintained more stably.

That is, it is because if the thickness Lb of the overlapping columnar structure region has a value of below of 1 μm, scattered light is easily generated in the connection part of the respective columnar structure regions, and it may be difficult to maintain the uniformity of the intensity of diffused light in the light diffusion angle region more stably. On the other hand, it is because if the thickness Lb of the overlapping columnar structure region has a value of above 40 μm, the extraction efficiency of diffused light may be decreased. That is, if the thickness Lb of the overlapping columnar structure region is too long, backscattering or the like occurs in the relevant region, and this is expected to cause a decrease in the extraction efficiency of diffused light.

Therefore, it is more preferable that the thickness Lb of the overlapping columnar structure region is adjusted to a value within the range of 3 to 35 μm, and even more preferably to a value within the range of 5 to 30 μm.

Furthermore, it is preferable that the thickness of the overlapping columnar structure region is adjusted to a value within the range of 0.1% to 10% of the film thickness (100%).

The reason for this is that, when the proportion occupied by the overlapping columnar structure region in the entirety of the film is adjusted to a value within such a range, the overlapping condition of the first columnar structure region and the second columnar structure region in the overlapping columnar structure region can be adjusted to a more suitable range, and therefore, the generation of scattered light in a columnar structure-unformed portion between the respective columnar structure regions can be suppressed, while the extraction efficiency of light diffusion can be maintained more stably.

That is, it is because if the proportion occupied by the overlapping columnar structure region in the entire film has a value of below 0.1%, the portion in which the first columnar structure region and the second columnar structure region do not form an overlapping structure microscopically may become large. Therefore, scattered light is liable to be generated in the relevant structural region, and the extraction efficiency of diffused light may be decreased. On the other hand, it is because if the proportion occupied by the overlapping columnar structure region in the entire film has a value of above 10%, the thickness of the first or second columnar structure region may become relatively insufficient.

Therefore, it is more preferable that the thickness of the overlapping columnar structure region is adjusted to a value within the range of 0.2% to 5%, and even more preferably to a value within the range of 0.5% to 4%, relative to the film thickness (100%).

6. Total Film Thickness

Furthermore, it is preferable that the total film thickness of the light diffusion film of the present invention is adjusted to a value within the range of 60 to 700 μm.

The reason for this is that, if the total film thickness of the light diffusion film has a value of below 60 μm, the amount of incident light that propagates straight through the columnar structure region increases, and it may be difficult to exhibit light diffusion. On the other hand, it is because if the total film thickness of the light diffusion film has a value of above 700 μm, when a columnar structure region is formed by irradiating a composition for light diffusion film with active energy radiation, the direction of progress of photopolymerization is diffused by the columnar structure formed initially, and it may be difficult to form a desired columnar structure region.

Therefore, it is more preferable that the total film thickness of the light diffusion film is adjusted to a value within the range of 80 to 450 μm, and even more preferably to a value within the range of 100 to 250 μm.

Meanwhile, it is also acceptable to provide, for example, a third columnar structure region, a fourth columnar structural region, and the like by further alternately forming the first columnar structure region and the second columnar structure region.

7. Combination of Angles of Inclination

Furthermore, when the light diffusion film of the present invention is used, the light diffusion characteristics can be changed by respectively regulating the angles of inclination θa of the pillar-shaped objects with respect to the film thickness direction in the first columnar structure region, and the angle of inclination θa' of the pillar-shaped objects in the film thickness direction in the second columnar structure region.

That is, for example, as illustrated in FIG. 3(a), by making the incident angle dependency of the respective columnar structure regions different, satisfactory incident angle dependency in transmission and diffusion of light can be realized, and also, the light diffusion angle region and the light diffusion incident angle region can be expanded effectively.

In this case, it is preferable that, in the first columnar structure region, the angle of inclination (θa in FIGS. 6(a) to 6(c)) of the pillar-shaped objects with respect to the film thickness direction is adjusted to a value within the range of −80° to 80°, while in the second columnar structure region, the angle of inclination (θa' in FIGS. 6(a) to 6(c)) of the pillar-shaped objects with respect to the film thickness direction is adjusted to a value within the range of −80° to 80°, and the absolute value of θa−θa' is adjusted to a value within the range of 0° to 80°. It is more preferable that the absolute value of θa−θa' is adjusted to a value within the range of 2° to 30°, and even more preferably to a value within the range of 5° to 20°.

Meanwhile, the term "satisfactory incident angle dependency" means that the distinction between the light diffusion incident angle region and the non-diffusion incident angle region in which incident light is directly transmitted without being diffused, is controlled in a well-defined manner.

On the other hand, as illustrated in FIG. 3(b), when the incident angle dependency of the respective columnar structure regions is overlapped, the contribution to the expansion of the light diffusion incident angle region is small; however, since the length of the pillar-shaped objects as a whole in the film thickness direction is extended stably, the uniformity of the intensity of diffused light within the light diffusion angle region can be expanded effectively.

In this case, it is preferable that, in the first columnar structure region, the angle of inclination θa of the pillar-shaped objects with respect to the film thickness direction is adjusted to a value within the range of −80° to 80°, while in the second columnar structure region, the angle of inclination θa' of the pillar-shaped objects with respect to the film thickness direction has a value within the range of −80° to 80°, and the absolute value of θa−θa' is adjusted to a value within the range of 0° to 20°, and it is more preferable that the absolute value of θa−θa' is adjusted to a value within the range of 2° to 15°.

Meanwhile, in regard to the light diffusion film of the present invention, usually, from the viewpoint of maintaining incident angle dependency with regularity, it is preferable that the directions of inclination of the pillar-shaped objects in the first and second columnar structure regions are the same direction or reverse directions when viewed from the above of the film; however, the direction of inclination is not limited to these depending on the applications.

Furthermore, a blank region in which no columnar structure is formed may be provided to a predetermined thickness in the lower part of the first columnar structure region and in the upper part of the second columnar structure region.

8. Adhesive Layer

Furthermore, the light diffusion film obtainable according to the production method of the present invention may also additionally include an adhesive layer to be laminated onto an adherend, on one surface or both surfaces of the light diffusion film.

The adhesive that constitutes such an adhesive layer is not particularly limited, and any conventionally known acrylic, silicone-based, urethane-based, or rubber-based adhesive can be used.

Second Embodiment

The second embodiment of the present invention relates to a method for manufacturing a light diffusion film characterized by including the following steps (a) to (d):

(a) a step of preparing a composition for light diffusion film;

(b) a step of applying the composition for light diffusion film on a process sheet, and forming a coating layer;

(c) a step of subjecting the coating layer to first active energy ray irradiation, forming a first columnar structure region in the lower portion of the coating layer, and simultaneously leaving a columnar structure-unformed region in the upper portion of the coating layer; and (d) a step of subjecting the coating layer to second active energy ray irradiation, and forming a second columnar structure region in the columnar structure-unformed region.

Hereinafter, the second embodiment of the present invention will be specifically explained with reference to the drawings, mainly based on the differences between the second embodiment and the first embodiment.

1. Step (a): Step of Preparing Composition for Light Diffusion Film

Such step is a step of preparing a predetermined composition for light diffusion film.

More specifically, it is a step of mixing at least two polymerizable compounds having different refractive indices, a photopolymerizable initiator and, if desired, other additives.

Furthermore, when mixing, the mixture may be stirred at room temperature but, from the viewpoint of improving uniformity, for example, it is preferable to stir the mixture under heating conditions at 40° C. to 80° C. to obtain a uniform liquid mixture.

Furthermore, in order to attain a desired viscosity suitable for coating, it is also preferable to further add a diluent solvent.

Hereinafter, the composition for light diffusion film will be explained more specifically.

(1) High-Refractive Index Polymerizable Compound (1)-1 Kind

Between the two polymerizable compounds having different refractive indices, the type of polymerizable compound with comparatively high refractive index (hereinafter, may be referred to as component (A)) is not particularly limited, but it is preferable to use a (meth)acrylic ester containing a plurality of aromatic rings as main component for the polymerizable compound.

The reason for this is presumed to be that, when a particular (meth)acrylic ester is incorporated as the component (A), the polymerization rate of the component (A) can be made faster than the polymerization rate of the polymerizable compound having a lower refractive index (hereinafter, may be referred to as component (B)), so as to induce a predetermined difference between the polymerization rates of these components, and thus copolymerizability of the two components can be effectively decreased.

As a result, when the composition is photocured, a columnar structure region formed by arranging plural pillar-shaped objects originating from the component (A) and having a relatively high refractive index, to stand close together in a region originating from the component (B) and having a relatively low refractive index, can be formed efficiently.

Furthermore, it is speculated that when the composition includes a particular (meth)acrylic acid ester as the component (A), the component (A) has sufficient compatibility with the component (B) in the stage of existing as a monomer, while having the compatibility with the component (B) decreased to a predetermined range in the stage of existing as plural monomer molecules connected in the course of polymerization, and the columnar structure region can be formed more efficiently.

Furthermore, when the composition includes a particular (meth)acrylic acid ester as the component (A), the refractive index of the regions originating from the component (A) in the columnar structure region can be increased, and the difference in the refractive index between the regions originating from the component (A) and the regions originating from the component (B) can be regulated to a value more than or equal to a predetermined value.

Therefore, when the composition for light diffusion film includes a particular (meth)acrylic acid ester as the component (A), a columnar structure region in which plural pillar-shaped objects having a relatively high refractive index are arranged to stand close together in a region having a relatively low refractive index can be obtained efficiently, together with the characteristics of the component (B) that will be described below.

Meanwhile, the term "(meth)acrylic ester containing a plurality of aromatic rings" means a compound having a plurality of aromatic rings in the ester residue moiety of the (meth)acrylic ester.

Furthermore, "(meth)acrylic" means both acrylic and methacrylic.

Furthermore, examples of a (meth)acrylic ester containing plural aromatic compounds as such a component (A) include biphenyl (meth)acrylate, naphthyl (meth)acrylate, anthracyl (meth)acrylate, benzylphenyl (meth)acrylate, biphenyloxyalkyl (meth)acrylate, naphthyloxyalkyl (meth)acrylate, anthracyloxyalkyl (meth)acrylate, benzylphenyloxyalkyl (meth)acrylate and the like, or compounds in which some of hydrogen atoms on the aromatic ring have been substituted by halogen, alkyl, alkoxy, halogenated alkyl, or the like.

Furthermore, as the (meth)acrylic ester containing a plurality of aromatic rings as the component (A), it is preferable for the composition for light diffusion film to contain a compound containing a biphenyl ring, and it is particularly preferable for the composition to contain a biphenyl compound represented by the following Formula (1):

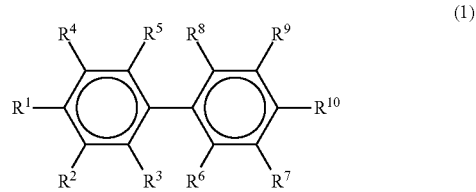

(1)

wherein, in Formula (1), $R^1$ to $R^{10}$ are respectively independent of each another; at least one of $R^1$ to $R^{10}$ is a substituent represented by the following Formula (2); and the rest of the substituents represents any one substituent selected from a hydrogen atom, a hydroxyl group, a carboxyl group, an alkyl group, an alkoxy group, a halogenated alkyl group, a hydroxyalkyl group, a carboxyalkyl group, and a halogen atom.

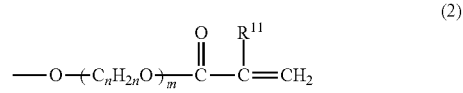

(2)

wherein in Formula (2), $R^{11}$ represents a hydrogen atom or a methyl group; the number of carbon atoms n represents an integer from 1 to 4; and the number of repetitions m represents an integer from 1 to 10.

The reason for this is presumed to be that, when a biphenyl compound having a particular structure is incorporated as the component (A), a predetermined difference between the polymerization rates of the component (A) and the component (B) is induced, and the compatibility between the component (A) and the component (B) can be decreased to a predetermined extent, so that copolymerizability between the two components can be decreased.

Furthermore, the refractive index of the regions originating from the component (A) in the columnar structure region can be increased, and the difference between the refractive index of the regions originating from the component (A) and the refractive index of the regions originating from the component (B) can be more easily regulated to a value more than or equal to a predetermined value.

Furthermore, when $R^1$ to $R^{10}$ in Formula (1) includes any one of an alkyl group, an alkoxy group, a halogenated alkyl group, a hydroxyalkyl group and a carboxyalkyl group, it is preferable to adjust the number of carbon atoms of the alkyl moiety to a value within the range of 1 to 4.

The reason for this is that, if such a number of carbon atoms has a value of above 4, the polymerization rate of the component (A) may be decreased, or the refractive index of the regions originating from the component (A) may be excessively lowered, and it may be difficult to form the columnar structure region efficiently.

Therefore, when $R^1$ to $R^{10}$ in Formula (1) includes any one of an alkyl group, an alkoxy group, a halogenated alkyl group, a hydroxyalkyl group and a carboxyalkyl group, it is more preferable to adjust the number of carbon atoms of the alkyl moiety to a value within the range of 1 to 3, and even more preferably to a value within the range of 1 to 2.

Furthermore, it is preferable that $R^1$ to $R^{10}$ in Formula (1) each represent a substituent other than a halogenated alkyl group or a halogen atom, that is, a substituent that does not contain halogen.

The reason for this is that when the light diffusion film is incinerated or the like, generation of dioxin is prevented, and it is preferable from the viewpoint of environmental protection.

Meanwhile, in regard to the conventional light diffusion films having a columnar structure, it has been general to subject the monomer components to halogen substitution for the purpose of increasing the refractive index of the monomer components, on the occasion of obtaining a predetermined columnar structure.

In this regard, when a biphenyl compound represented by Formula (1) is used, even if halogen substitution is not performed, a high refractive index can be obtained.

Therefore, if a light diffusion film formed by photocuring the composition for light diffusion film according to the present invention is used, it can exhibit satisfactory incident angle dependency, even without a compound containing halogen.

Furthermore, it is preferable that any one of $R^2$ to $R^9$ in Formula (1) be a substituent represented by Formula (2).

The reason for this is that, when the position of the substituent represented by Formula (2) is set to a position other than the position of $R^1$ and the position of $R^{10}$, the molecules of the component (A) can be effectively prevented from aligning and crystallizing in a stage prior to photocuring.

Furthermore, the compound is liquid at the monomer stage prior to photocuring, and the compound can be apparently uniformly mixed with the component (B) even if a diluent solvent or the like is not used.

It is because thereby, aggregation and phase separation at a fine level of the component (A) and the component (B) are enabled in the stage of photocuring, and a light diffusion film having a columnar structure region can be obtained more efficiently.

Furthermore, from the same viewpoint, it is particularly preferable that any one of $R^3$, $R^5$, $R^6$ and $R^8$ in Formula (1) be a substituent represented by Formula (2).

Furthermore, it is usually preferable that the number of repetitions m in the substituent represented by Formula (2) be defined as an integer from 1 to 10.

The reason for this is that, if the number of repetitions m has a value exceeding 10, the oxyalkylene chain that links the polymerization site and the biphenyl ring becomes too long, and polymerization of the molecules of the component (A) at the polymerization site may thereby be inhibited.

Therefore, it is more preferable that the number of repetitions m for the substituent represented by Formula (2) be defined as an integer from 1 to 4, and particularly preferable that it be defined as an integer from 1 to 2.

Meanwhile, from the same viewpoint, it is usually preferable that the number of carbon atoms n for the substituent represented by Formula (2) be defined as an integer from 1 to 4.

Furthermore, upon considering the case in which the position of a polymerizable carbon-carbon double bond serving as a polymerization site is so close to the biphenyl ring that the biphenyl ring imposes steric hindrance, and the polymerization rate of the component (A) is decreased, it is more preferable that the number of carbon atoms n for the substituent represented by Formula (2) be defined as an integer from 2 to 4, and particularly preferable that it be defined as an integer from 2 to 3.

Furthermore, specific preferred examples of the biphenyl compound represented by Formula (1) include compounds represented by the following formulas (3) and (4):

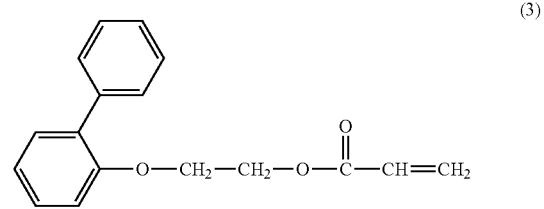 [SMILES: C=CC(=O)OCCOc1ccccc1-c1ccccc1]

(3)

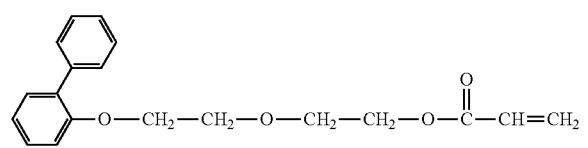

(4)

(1)-2 Molecular Weight

Furthermore, it is preferable to adjust the molecular weight of the component (A) to a value within the range of 200 to 2,500.

The reason for this is that, by adjusting the molecular weight of the component (A) to a value in a predetermined range, it is presumed that the polymerization rate of the component (A) can be made faster, and copolymerizability of the component (A) and the component (B) can be decreased more effectively.

As a result, when the composition is photocured, a columnar structure region in which plural pillar-shaped objects originating from the component (A) and having a relatively high refractive index are arranged to stand close together in a region originating from the component (B) and having a relatively low refractive index, can be formed more efficiently.

That is, it is because, if the molecular weight of the component (A) has a value of below 200, the polymerization rate is decreased by steric hindrance and becomes closer to the polymerization rate of the component (B), and copolymerization with the component (B) is likely to occur. On the other hand, it is speculated that if the molecular weight of the component (A) has a value of above 2,500, in addition to the difference in the molecular weight between the component (A) and the component (B) becoming smaller, the polymerization rate of the component (A) is decreased and becomes closer to the polymerization rate of the component (B), and copolymerization with the component (B) is likely to occur. As a result, it may be difficult to form a columnar structure region efficiently.

Therefore, it is more preferable to adjust the molecular weight of the component (A) to a value within the range of 240 to 1,500, and even more preferably to a value within the range of 260 to 1,000.

Meanwhile, the molecular weight of the component (A) can be determined from the calculated value obtainable from the composition of the molecules and the atomic weight of the constituent atoms, or can be measured as the weight average molecular weight using gel permeation chromatography (GPC).

(1)-3 Single Use

Furthermore, the composition for light diffusion film according to the present invention is characterized by including the component (A) as a monomer component that forms a region having a relatively high refractive index in the columnar structure region; however, it is preferable that the component (A) is included as a single component.

The reason for this is that, when such a configuration is adopted, the fluctuation in the refractive index of the region originating from the component (A), that is, the pillar-shaped objects having a relatively high refractive index, can be suppressed effectively, and thereby, a light diffusion film having a columnar structure region can be obtained more efficiently.

That is, when the compatibility of the component (A) with the component (B) is low, for example, when the component (A) is a halogen-based compound or the like, another component (A) (for example, a non-halogen-based compound) may be used jointly as a third component for making the component (A) compatible with the component (B).

However, in that case, the refractive index in the region with comparatively high refractive index, originating from the component (A), may fluctuate or may become prone to decrease, due to the influence of such a third component.

As a result, the difference in refractive index with the region with comparatively low refractive index, originating from the component (B), may become non-uniform, or may be prone to decrease excessively.

Therefore, it is preferable to select a high refractive index monomer component having compatibility with the component (B), and use that monomer component as a single component (A).

Meanwhile, for example, since a biphenyl compound represented by Formula (3) as the component (A) has a low viscosity, the biphenyl compound can be used as a single component (A) in order to have compatibility with the component (B).

(1)-4 Refractive Index

Furthermore, it is preferable that the refractive index of the component (A) is adjusted to a value within the range of 1.5 to 1.65.

The reason for this is that when the refractive index of the component (A) has a value within such a range, the difference between the refractive index of the region originating from the component (A) and the refractive index originating from the component (B) can be regulated more easily, and thereby a light diffusion film having a columnar structure region can be obtained more efficiently.

That is, if the refractive index of the component (A) has a value of below 1.5, the difference between the refractive index of the component (A) and the refractive index of the component (B) becomes too small, and it may be difficult to obtain an effective light diffusion angle region. On the other hand, if the refractive index of the component (A) has a value exceeding 1.65, the difference between the refractive index of the component (A) and the refractive index of the component (B) becomes large, but it may be difficult to even form an apparent compatibility with the component (B).

Therefore, it is more preferable to adjust the refractive index of the component (A) to a value within the range of 1.52 to 1.62 and even more preferable to a value within the range of 1.56 to 1.6.

Meanwhile, the refractive index of the component (A) means the refractive index of the component (A) prior to photocuring.

Furthermore, the refractive index can be measured according to JIS K0062.

(1)-5 Content

Furthermore, it is preferable to adjust the amount of component (A) in the composition for light diffusion film to a value within the range of 25 parts to 400 parts by weight relative to 100 parts by weight of the component (B), which is a polymerizable compound with relatively low refractive index that will be described hereinafter.

The reason for this is that, if the content of the component (A) has a value of below 25 parts by weight, the existence ratio of the component (A) to the component (B) is small, the width of the pillar-shaped objects originating from the component (A) becomes excessively small, and it may be difficult to obtain a columnar structure region having satisfactory incident angle dependency. Furthermore, it is because the length of the pillar-shaped objects in the thickness direction of the light diffusion film becomes insufficient, and light diffusibility may not be manifested. On the other hand, it is because if the content of the component (A) has a value of above 400 parts by weight, the existence ratio of the component (A) to the component (B) is increased, the width of the pillar-shaped objects originating from the component (A) becomes excessively large, and in contrast, it may be difficult to obtain a columnar structure region having satisfactory incident angle dependency. Furthermore, it is because the length of the pillar-shaped objects in the thickness direction of the light diffusion film becomes insufficient, and light diffusibility may not be manifested.

Therefore, it is more preferable to adjust the amount of component (A) to a value within the range of 40 parts to 300 parts by weight, and even more preferably to a value within the range of 50 parts to 200 parts by weight, relative to 100 parts by weight of the component (B).

(2) Low-Refractive Index Polymerizable Compound (2)-1 Kind

Between the two polymerizable compounds having different refractive indices, the type of the polymerizable compound with comparatively low refractive index (component (B)) is not particularly limited, and examples of main component thereof include urethane (meth)acrylate, a (meth)acrylic polymer having a (meth)acryloyl group in a side chain, a (meth)acryloyl group-containing silicone resin, and an unsaturated polyester resin. However, as main component, it is particularly preferable to use urethane (meth)acrylate.

The reason for this is that when a urethane (meth)acrylate is used, the difference between the refractive index of the regions originating from the component (A) and the refractive index of the regions originating from the component (B) can be regulated more easily, the fluctuation in the refractive index of the regions originating from the component (B) can be suppressed effectively, and a light diffusion film having a columnar structure region can be obtained more efficiently.

Therefore, in the following, for the component (B), urethane (meth)acrylate will mainly be described.

Meanwhile, (meth)acrylate means both acrylate and methacrylate.

First, urethane (meth)acrylate is formed from (B1) a compound containing at least two isocyanate groups; (B2) a polyol compound, preferably a diol compound, and particularly preferably polyalkylene glycol; and (B3) hydroxyalkyl (meth)acrylate.

Meanwhile, the component (B) is intended to include an oligomer having a repeating unit of urethane bond.

Among these, examples for the component (B1), the compound containing at least two isocyanate groups, include aromatic polyisocyanates such as 2,4-tolylene diisocyanate, 2,6-tolylene diisocyanate, 1,3-xylylene diisocyanate, and 1,4-xylylene diisocyanate; aliphatic polyisocyanates such as hexamethylene diisocyanate; alicyclic polyisocyanates such as isophorone diisocyanate (IPDI) and hydrogenated diphenylmethane diisocyanate; biuret forms and isocyanurate forms thereof; and adducts that are reaction products with low molecular weight active hydrogen-containing compounds and the like such as ethylene glycol, propylene glycol, neopentyl glycol, trimethylolpropane, and castor oil (for example, xylylene diisocyanate-based trifunctional adduct).

Furthermore, among the compounds described above, it is particularly preferable to have an alicyclic polyisocyanate.

The reason for this is that alicyclic polyisocyanates are likely to provide differences in the reaction rates of the various isocyanate groups in relation to the conformation or the like, as compared with aliphatic polyisocyanates.

Thereby, the reactions of the component (B1) with only the component (B2), or the component (B1) with only the component (B3) can be inhibited, and the component (B1) can react reliably with the component (B2) and the component (B3), so that generation of excess byproducts can be prevented.

As a result, the fluctuation in the refractive index in the regions originating from the component (B), that is, the low-refractive index regions, in the columnar structure region can be suppressed effectively.

Furthermore, when an alicyclic polyisocyanate is used, the compatibility between the component (B) and the component (A) thus obtainable can be decreased to a predetermined range, and a columnar structure region can be formed more efficiently, compared to an aromatic polyisocyanate.

Furthermore, with an alicyclic polyisocyanate, since the refractive index of the component (B) thus obtainable can be made smaller compared to an aromatic polyisocyanate, the difference between the refractive index of the component (B) and the refractive index of the component (A) can be made larger, light diffusibility can be manifested more reliably, and also, a columnar structure region having high uniformity of diffused light within the light diffusion angle region can be formed more efficiently.

Furthermore, among such alicyclic polyisocyanates, an alicyclic diisocyanate containing only two isocyanate groups is preferred.

The reason for this is that when an alicyclic diisocyanate is used, the component (B2) and the component (B3) react quantitatively, and a single component (B) can be obtained.

Particularly preferred examples of such an alicyclic diisocyanate include isophorone diisocyanate (IPDI).

The reason for this is that a significant difference can be provided in the reactivity of two isocyanate groups.

Furthermore, among the components forming urethane (meth)acrylate, for the component (B2), examples of polyalkylene glycol include polyethylene glycol, polypropylene glycol, polybutylene glycol, and polyhexylene glycol and the like, and among them, polypropylene glycol is particularly preferred.

The reason for this is that, since a urethane (meth)acrylate derived from polypropylene glycol has low viscosity, the urethane (meth)acrylate can be handled in a solventless manner.

Furthermore, with polypropylene glycol, when the component (B) is cured, the polypropylene glycol forms a satisfactory soft segment in the cured product, and handling ability or decorativeness of the light diffusion film can be enhanced effectively.

Meanwhile, the weight average molecular weight of the component (B) can be adjusted mainly by the weight average molecular weight of the component (B2). Here, the weight average molecular weight of the component (B2) is usually 2,300 to 19,500, preferably 4,300 to 14,300, and particularly preferably 6,300 to 12,300.

Furthermore, among the components forming urethane (meth)acrylate, for the component (B3), examples of hydroxyalkyl (meth)acrylate include 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, and 4-hydroxybutyl (meth)acrylate and the like.

Furthermore, from the viewpoint of decreasing the obtainable polymerization rate of the urethane (meth)acrylate and forming a predetermined columnar structure more efficiently, particularly a hydroxyalkyl methacrylate is more preferred, and 2-hydroxyethyl methacrylate is even more preferred.

Furthermore, synthesis of the urethane (meth)acrylate based on the components (B1) to (B3) can be carried out by a conventional method.

In this case, it is preferable to adjust the mixing ratio of the components (B1) to (B3) to a mole ratio of component (B1):component (B2):component (B3)=1 to 5:1:1 to 5.

The reason for this is that, with such a mixing ratio, a urethane (meth)acrylate can be efficiently synthesized, in which each one of the isocyanate groups carried by the components (B1) has reacted with the two hydroxyl groups carried by the component (B2) and bonded thereto, and the hydroxyl groups carried by the component (B3) have reacted with the other isocyanate group respectively carried by the two components (B1) and bonded thereto.

Therefore, it is more preferable to adjust the mixing ratio of the components (B1) to (B3) to a molar ratio of component (B1):component (B2):component (B3)=1 to 3:1:1 to 3, and even more preferably to the ratio of 2:1:2.

(2)-2 Weight Average Molecular Weight

Furthermore, it is preferable to adjust the weight average molecular weight of the component (B) to a value within the range of 3,000 to 20,000.

The reason for this is that, by adjusting the weight average molecular weight of the component (B) to a predetermined range, a predetermined difference is caused between the polymerization rates of the component (A) and the component (B), and thus copolymerizability of the two components can be effectively decreased.

As a result, when the composition is photocured, a columnar structure region in which plural pillar-shaped objects originating from the component (A) and having a relatively high refractive index are arranged to stand close together in a region originating from the component (B) and having a relatively low refractive index, can be formed efficiently.

That is, it is because, if the weight average molecular weight of the component (B) has a value of below 3,000, the polymerization rate of the component (B) is increased to become closer to the polymerization rate of the component (A), and copolymerization with the component (A) is likely to occur, so that as a result, it may be difficult to form a columnar structure region efficiently. On the other hand, it is because, if the weight average molecular weight of the component (B) has a value of above 20,000, it may be difficult to form a columnar structure region in which plural pillar-shaped objects derived from the component (A) and having a relatively high refractive index are arranged to stand close together in a region derived from the component (B) and having a relatively low refractive index, or the compatibility with the component (A) is excessively decreased, so that the component (A) may be precipitated out or the like in the stage of application.

Therefore, it is more preferable to adjust the weight average molecular weight of the component (B) to a value within the range of 5,000 to 15,000, and even more preferable to adjust it to a value within the range of 7,000 to 13,000.

Meanwhile, the weight average molecular weight of the component (B) can be measured using gel permeation chromatography (GPC).

(2)-3 Single Use

Furthermore, regarding the component (B), two or more kinds having different molecular structures or weight average molecular weights may be used in combination; however, from the viewpoint of suppressing the fluctuation in the refractive index of the regions originating from the component (B) in the columnar structure region, it is preferable to use only one kind.

That is, it is because when a plurality of compounds are used for the component (B), the refractive index for the region with comparatively low refractive index originating from the component (B) may fluctuate or increase, and the difference of refractive index with the region with comparatively high refractive index originating from the component (A) may become non-uniform or decrease excessively.

(2)-4 Refractive Index

Furthermore, it is preferable that the refractive index of the component (B) is adjusted to a value within the range of 1.4 to 1.55.

The reason for this is that, when the refractive index of the component (B) is adjusted to a value within such a range, the difference between the refractive index of the regions originating from the component (A) and the refractive index of the regions originating from the component (B) can be regulated more easily, and a light diffusion film having a columnar structure region can be obtained more efficiently.

That is, it is because, if the refractive index of the component (B) has a value of below 1.4, the difference between the refractive index of the component (B) and the refractive index of the component (A) becomes large; however, compatibility with the component (A) is extremely deteriorated, and there is a risk that a columnar structure region may not be formed. On the other hand, it is because if the refractive index of the component (B) has a value of above 1.55, the difference between the refractive index of the component (B) and the refractive index of the component (A) becomes excessively small, and it may be difficult to obtain desired incident angle dependency.

Therefore, it is more preferable to adjust the refractive index of the component (B) to a value within the range of 1.45 to 1.54, and even more preferably to a value within the range of 1.46 to 1.52.

Meanwhile, the refractive index of the component (B) described above means the refractive index of the component (B) prior to photocuring.

The refractive index can be measured, for example, according to JIS K0062.

Furthermore, it is preferable to adjust the difference between the refractive indices of the component (A) and the component (B) to a value of 0.01 or more.

The reason for this is that, when such difference in refractive index is adjusted to a value in a predetermined range, a light diffusion film can be obtained, which has more satisfactory incident angle dependency in connection with the transmission and the diffusion of light, and has a broader light diffusion incident angle region.

That is, it is because, if such a difference in the refractive index has a value of below 0.01, the angle range for total reflection of the incident light in the columnar structure region is narrowed, and the angle of aperture in light diffusion may be excessively narrowed. On the other hand, it is because, if such a difference in the refractive index has an excessively large value, compatibility between the component (A) and the component (B) is excessively deteriorated, and there is a risk that a columnar structure region may not be formed.

Therefore, it is more preferable to adjust the difference between the refractive indices of the component (A) and the component (B) to a value within the range of 0.05 to 0.5, and even more preferable to adjust it to a value within the range of 0.1 to 0.2.

Meanwhile, the refractive indices of the component (A) and the component (B) mean the refractive indices of the component (A) and the component (B) prior to photocuring.

(2)-5 Content

Furthermore, it is preferable that the content of the component (B) in the composition for light diffusion film is adjusted to a value within the range of 10 parts to 80 parts by weight relative to 100 parts by weight of the total amount of the composition for light diffusion film.

The reason for this is that, if the content of the component (B) has a value of below 10 parts by weight, the existence ratio of the component (B) to the component (A) becomes small, the regions originating from the component (B) become excessively small compared to the regions originating from the component (A), and it may be difficult to obtain a columnar structure region having satisfactory incident angle dependency. On the other hand, it is because, if the content of the component (B) has a value of above 80 parts by weight, the existence ratio of the component (B) to the component (A) is increased, the regions originating from the component (B) become excessively large compared to the regions originating from the component (A), and in contrast, it may be difficult to obtain a columnar structure region having satisfactory incident angle dependency.

Therefore, it is more preferable that the content of the component (B) is adjusted to a value within the range of 20 parts to 70 parts by weight, and even more preferably to a value within the range of 30 parts to 60 parts by weight, relative to 100 parts by weight of the total amount of the composition for light diffusion film.

(3) Photopolymerization Initiator

Furthermore, in the composition for light diffusion film according to the present invention, if desired, it is preferable to incorporate a photopolymerization initiator as a component (C).

The reason for this is that by incorporating a photopolymerization initiator, a columnar structure region can be formed efficiently when the composition for light diffusion film is irradiated with active energy radiation.

Here, a photopolymerization initiator refers to a compound which generates radical species when irradiated with active energy radiation such as ultraviolet radiation.

Examples of such a photopolymerization initiator include benzoin, benzoin methyl ether, benzoin ethyl ether, benzoin isopropyl ether, benzoin n-butyl ether, benzoin isobutyl ether, acetophenone, dimethylaminoacetophenone, 2,2-dimethoxy-2-phenylacetophenone, 2,2-diethoxy-2-phenylacetophenone, 2-hydroxy-2-methyl-1-phenylpropan-1-one, 1-hydroxycyclohexyl phenyl ketone, 2-methyl-1-[4-(methylthio)phenyl]-2-morpholinopropan-1-one, 4-(2-hydroxyethoxy)phenyl 2-(hydroxy-2-propyl) ketone, benzophenone, p-phenylbenzophenone, 4,4-diethylaminobenzophenone, dichlorobenzophenone, 2-methylanthraquinone, 2-ethylanthraquinone, 2-tertiary-butylanthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyl dimethyl ketal, acetophenone dimethyl ketal, p-dimethylamine benzoic acid ester, and oligo [2-hydroxy-2-methyl-1-[4-(1-methylvinyl)phenyl]propane]. Among these, one type of compound may be used alone, or two or more types of compounds may be used in combination.

Meanwhile, when a photopolymerization initiator is incorporated, it is preferable to adjust the amount of photopolymerization initiator to a value within the range of 0.2 parts to 20 parts by weight, more preferable to adjust it to a value within the range of 0.5 parts to 15 parts by weight, and even more preferable to adjust it to a value within the range of 1 part to 10 parts by weight, relative to 100 parts by weight of the total amount of the component (A) and the component (B).

(4) Other Additives

Furthermore, additives other than the compounds described above can be appropriately added to the extent that the effect of the present invention is not impaired.

Examples of such additives include an oxidation inhibitor, an ultraviolet absorber, an antistatic agent, a polymerization accelerator, a polymerization inhibitor, an infrared absorber, a plasticizer, a diluent solvent, a leveling agent, and the like.

Meanwhile, it is generally preferable to adjust the amount of such additives to a value within the range of 0.01 parts to 5 parts by weight, more preferable to adjust it to a value within the range of 0.02 parts to 3 parts by weight, and even more preferable to adjust it to a value within the range of 0.05 parts to 2 parts by weight, relative to 100 parts by weight of the total amount of the component (A) and the component (B).

2. Step (b): Application Step

Figure 7A:
FIGS. 7(a) to 7(c) are diagrams provided to explain an outline of the production method of the present invention.
Figure 7B:
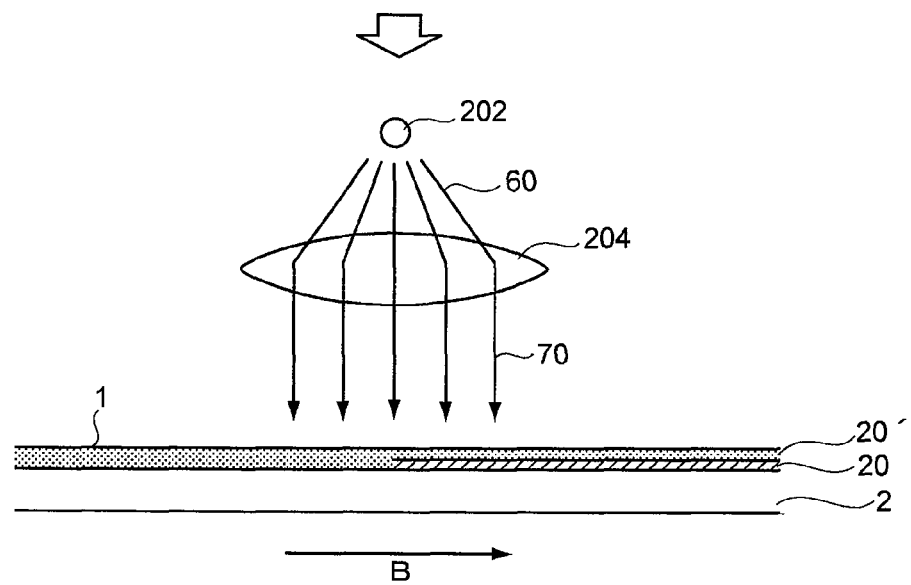

Step (b) is a step of applying the composition for light diffusion film on a process sheet 2, and forming a coating layer 1, as illustrated in FIG. 7(*a*).

Regarding the process sheet, a plastic film and paper can all be used.

Among these, examples of plastic films include polyester-based films such as a polyethylene terephthalate film; polyolefin-based films such as a polyethylene film and a polypropylene film, cellulose-based films such as a triacetyl cellulose film, polyimide-based films, and the like.

Furthermore, examples of paper include glassine paper, coated paper, and laminate paper.

Furthermore, in consideration of the processes that will be described below, the process sheet 2 is preferably a plastic film that has excellent dimensional stability against heat or active energy radiation.

Preferred examples of such film include, among those described above, a polyester-based film, a polyolefin-based film, and a polyimide-based film.

Furthermore, in the process sheet, it is preferable to provide a release layer on the side of the surface coated with the composition for light diffusion film in the process sheet, in order to facilitate peeling of the light diffusion film obtained after photocuring from the process sheet.

Such a release layer can be formed using a conventionally known release agent such as a silicone-based release agent, a fluorine-based release agent, an alkyd-based release agent, an olefin-based release agent or the like.

Meanwhile, usually, the thickness of the process sheet is preferably adjusted to a value within the range of 25 μm to 200 μm.

Furthermore, the method of applying a composition for light diffusion film on a process sheet can be carried out by, for example, a conventionally known method such as a knife coating method, a roll coating method, a bar coating method, a blade coating method, a die coating method, or a gravure coating method.

Meanwhile, at this time, it is preferable that the film thickness of the coating layer is adjusted to a value within the range of 60 to 700 μm.

3. Step (c): First Active Energy Ray Irradiation Step

Step (c) is, as illustrated in FIG. 7(*b*), a step of subjecting the coating layer 1 to first active energy ray irradiation, and forming a first columnar structure region 20 in the lower portion of the coating layer 1, while leaving a columnar structure-unformed region 20' in the upper portion of the coating layer 1.

That is, in the first active energy ray irradiation step, parallel light with high parallelism of light rays is irradiated to the coating layer formed on the process sheet.

Here, parallel light means a light in which the direction of emitted light is approximately parallel without any spreading when viewed from any direction.

More specifically, for example, as illustrated in FIG. 8(*a*), it is preferable that irradiated light 60 coming from a point light source 202 is converted to parallel light 70 by means of a lens 204, and then the parallel light is irradiated to the coating layer, or as illustrated in FIGS. 8(*b*) and 8(*c*), irradiated light 60 coming from a linear light source 125 is converted to parallel light 70 by means of irradiated light parallelizing members 200 (200*a*, 200*b*), and then the parallel light is irradiated to the coating layer.

Meanwhile, as illustrated in FIG. 8(*d*), the irradiated light parallelizing members 200 can convert direct light emitted by a linear light source 125 to parallel light, by unifying the direction of light using, for example, light blocking members 210 as a broader term, such as plate-shaped members 210*a* of FIG. 8(*b*) or cylindrical members 210*b* of FIG. 8(*c*), in a direction parallel to the axial line direction of the linear light source 125 whose direction of light is random, among the direct light emitted by the linear light source 125.

More specifically, among the direct light emitted by the linear light source 125, light with low parallelism with respect to the light blocking members 210 such as plate-shaped members 210*a* or cylindrical members 210*b*, is brought into contact with these light blocking members and is absorbed.

Therefore, only light with high parallelism, that is, parallel light, with respect to the light blocking members 210 such as plate-shaped members 210*a* or cylindrical members 210*b* can pass through the irradiated light parallelizing members 200, and as a result, the direct light emitted by the linear light source 125 is converted to parallel light by the irradiated light parallelizing members 200.

Meanwhile, the material for the light blocking members 210 such as plate-shaped members 210*a* or cylindrical members 210*b* is not particularly limited as long as the material can absorb light with low parallelism with respect to the light blocking members 210, and for example, a heat resistant black-painted ulster steel sheet can be used.

It is also preferable that the parallelism of the irradiated light is adjusted to a value of 10° or less.

The reason for this is that when the parallelism of the irradiated light is adjusted to a value within such a range, a columnar structure region in which plural pillar-shaped objects are arranged to stand close together at a constant angle of inclination with respect to the film thickness direction, can be formed efficiently and stably.

Therefore, it is more preferable that the parallelism of the irradiated light is adjusted to a value of 5° or less, and even more preferably to a value of 2° or less.

Figure 9:
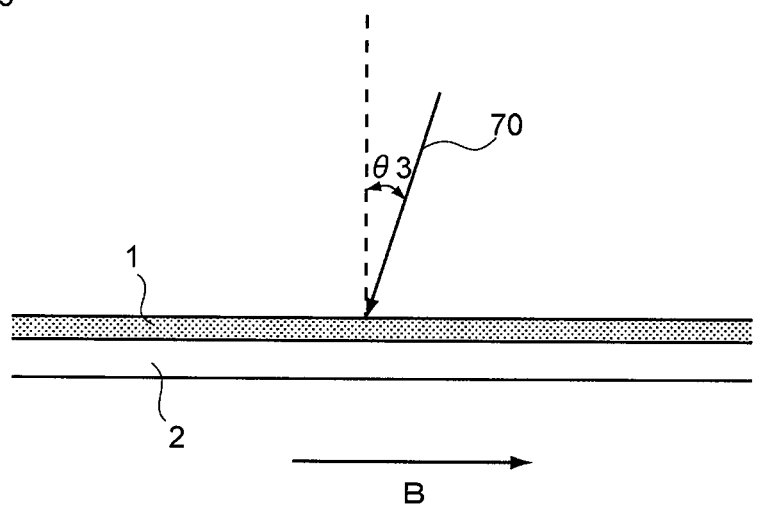
FIG. 9 is a diagram provided to explain the angle of irradiation of parallel light.

Furthermore, regarding the angle of irradiation of the irradiated light, it is preferable that the angle of irradiation θ3 as shown in FIG. 9, in the case in which the angle of the normal line with respect to the surface of the coating layer 1 is designated as 0°, is adjusted to a value within the range of usually −80° to 80°.

The reason for this is that when the angle of irradiation has a value other than the range of −80° to 80°, the influence of reflection or the like at the surface of the coating layer 1 is increased, and it may be difficult to form a sufficient columnar structure region.

Meanwhile, the arrow B in FIG. 9 indicates the traveling direction of the coating layer.

Furthermore, examples of the irradiated light include ultraviolet radiation or an electron beam; however, it is preferable to use ultraviolet radiation.

The reason for this is that, in the case of an electron beam, since the polymerization rate is very fast, the component (A) and the component (B) may not undergo phase separation sufficiently during the course of polymerization, and it may be difficult to form a columnar structure. On the other hand, it is because when compared with visible light or the like, ultraviolet radiation is associated with a wide variety of ultraviolet-curable resins that are cured by irradiation of ultraviolet radiation, or a wide variety of photopolymerization initiators that can be used, and therefore, the widths of selection of the component (A) and the component (B) can be broadened.

Furthermore, regarding the conditions for irradiation of first active energy radiation, it is preferable that the peak illuminance at the coating layer surface is adjusted to a value within the range of 0.1 to 3 mW/cm$^2$.

The reason for this is that, if such a peak illuminance has a value of below 0.1 mW/cm$^2$, a columnar structure-unformed region can be secured sufficiently; however, it may be difficult to form the first columnar structure region in a well-defined manner. On the other hand, it is because, if such a peak illuminance has a value of above 3 mW/cm$^2$, even though a column structure-unformed region exists, it is speculated that the curing reaction proceeds excessively in the relevant region, and it may be difficult to form the second columnar structure region sufficiently in the second active energy ray irradiation step that will be described below.

Therefore, it is more preferable that the peak illuminance at the coating layer surface during the first active energy ray irradiation is adjusted to a value within the range of 0.3 to 2 mW/cm$^2$, and even more preferably to a value within the range of 0.5 to 1.5 mW/cm$^2$.

Furthermore, it is preferable that the cumulative amount of light at the coating layer surface for the first active energy ray irradiation is adjusted to a value within the range of 5 to 100 mJ/cm$^2$.

The reason for this is that, if such a cumulative amount of light has a value of below 5 mJ/cm$^2$, it may be difficult to extend the first columnar structure region sufficiently from the upper part toward the lower part, or the first columnar structure region may be deformed when the second columnar structure region is formed. On the other hand, it is because if such a cumulative amount of light has a value of above 100 mJ/cm$^2$, curing of the columnar structure-unformed region proceeds excessively, and in the second active energy ray irradiation step that will be described below, it may be difficult to form the second columnar structure region sufficiently.

Therefore, it is more preferable that the cumulative amount of light at the coating layer surface in the first active energy ray irradiation is adjusted to a value within the range of 7 to 50 mJ/cm$^2$, and even more preferably to a value within the range of 10 to 30 mJ/cm$^2$.

Furthermore, it is preferable that at the time of the first active energy ray irradiation, the coating layer formed on the process sheet is moved at a speed of 0.1 to 10 m/min.

The reason for this is that, if such a speed has a value of below 0.1 m/min, mass productivity may be excessively decreased. On the other hand, if such a speed has a value of above 10 m/min, the travel speed may be faster than the speed of curing of the coating layer, in other words, the speed of formation of the columnar structure region, the incident angle of ultraviolet radiation to the coating layer may change, and the formation of the columnar structure region may be achieved insufficiently.

Therefore, it is more preferable that, at the time of the first active energy ray irradiation, the coating layer formed on the process sheet is moved at a speed within the range of 0.2 to 5 m/min, and is even more preferably moved at a speed within the range of 0.3 to 3 m/min.

Furthermore, it is preferable from the viewpoint of efficiently leaving a columnar structure-unformed region, the first active energy ray irradiation step is carried out in an atmosphere containing oxygen (preferably, in an air atmosphere).

The reason for this is that when the first active energy ray irradiation is carried out in an atmosphere containing oxygen, while the first columnar structure region can be formed efficiently in the lower portion of the coating layer, a columnar structure-unformed region can be left stably in the upper portion of the coating layer by utilizing the influence of oxygen inhibition.

Therefore, in the second active energy ray irradiation that will be described below, a second columnar structure-unformed region can be left efficiently in such a columnar structure-unformed region.

That is, it is because, if the first active energy ray irradiation is carried out not in an atmosphere containing oxygen but in a non-oxygen atmosphere that does not contain oxygen, the first columnar structure region may be formed continuously, almost to the outermost surface of the film, without leaving a columnar structure-unformed region in the upper part of the film.

Meanwhile, the term "in an atmosphere containing oxygen" means conditions in which the surface of the coating layer is in direct contact with a gas containing oxygen such as air, and among others, the term "in an air atmosphere" means conditions in which the surface of the coating layer is in direct contact with air.

Therefore, performing the first active energy ray irradiation in a state that the surface of the coating layer is exposed directly to air without laminating a film on the surface of the coating layer or performing a particular means such as performing nitrogen purge, corresponds to the first active energy ray irradiation "in an air atmosphere".

4. Step (d): Second Active Energy Ray Irradiation Step

Figure 7C:
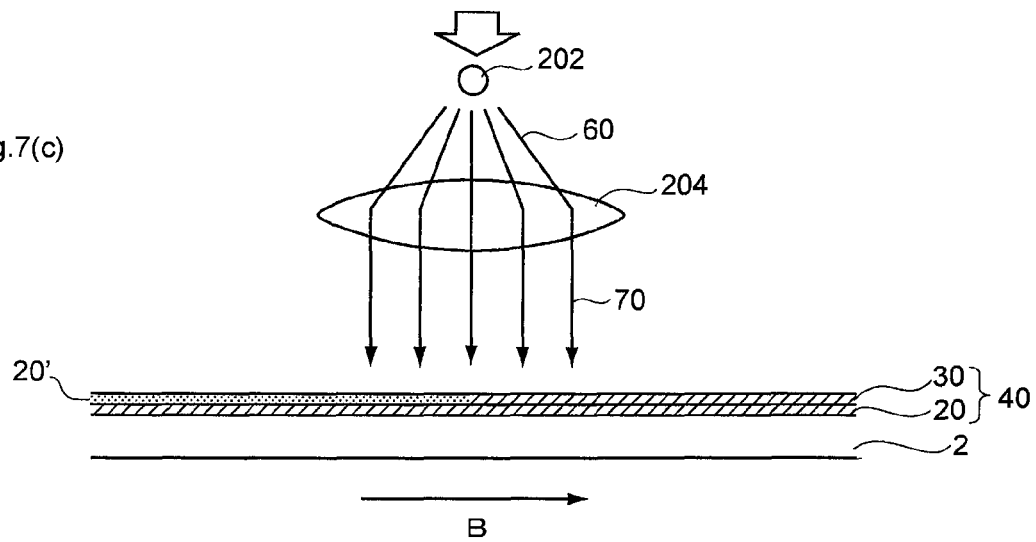
Figure 8A:
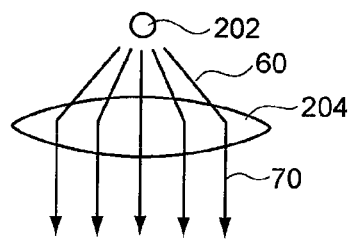
FIGS. 8(a) to 8(d) are diagrams provided to explain the irradiation of parallel light.
Figure 8B:
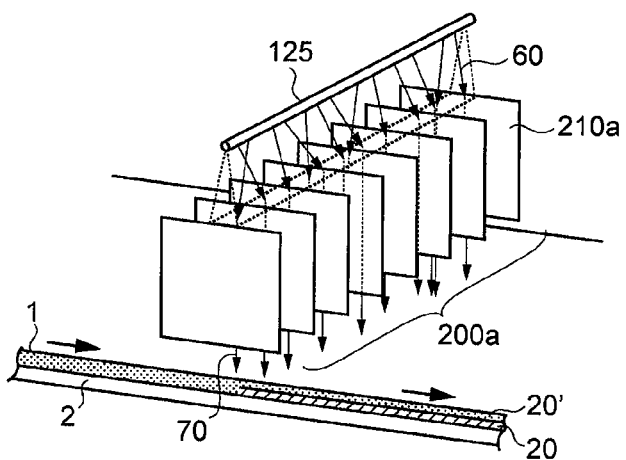
Figure 8C:
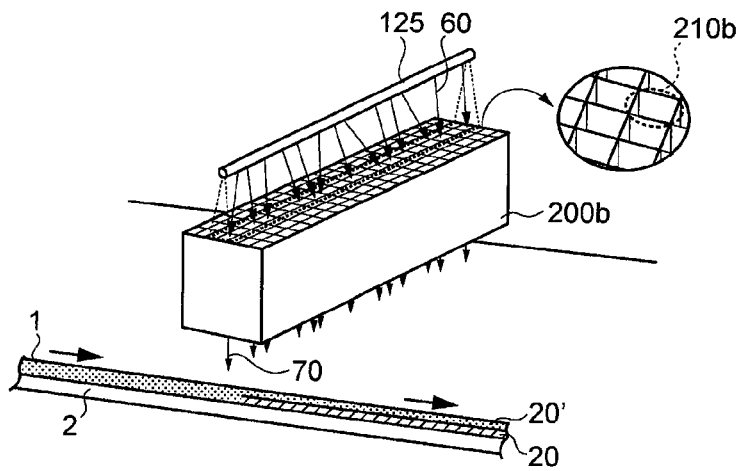
Figure 8D:
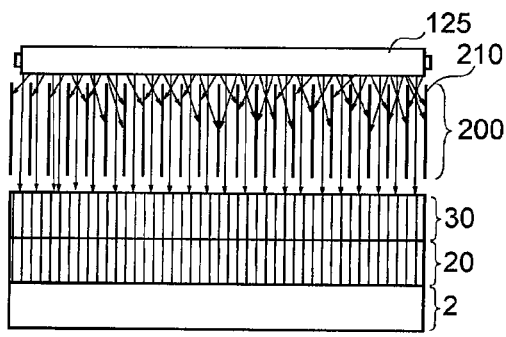

Step (d) is, as illustrated in FIG. 7(c), a step of forming a second columnar structure region 30 in the columnar structure-unformed region 20' by further subjecting the coating layer 1 to second active energy ray irradiation.

Such a second active energy ray irradiation step can be basically carried out similarly to the first active energy ray irradiation step.

Furthermore, regarding the conditions for irradiation of the second active energy radiation, it is preferable that the peak illuminance at the coating layer surface is adjusted to a value within the range of 0.1 to 20 mW/cm$^2$.

The reason for this is that, if such a peak illuminance has a value of below 0.1 mW/cm$^2$, it may be difficult to form the second columnar structure region in a well-defined manner. On the other hand, it is because if such an illuminance has a value of above 20 mW/cm$^2$, it is speculated that the curing speed becomes excessively fast, and the second columnar structure region may not be formed effectively.

Therefore, it is more preferable that the peak illuminance of ultraviolet radiation at the coating layer surface is adjusted to a value within the range of 0.3 to 10 mW/cm$^2$, and even more preferably to a value within the range of 0.5 to 5 mW/cm$^2$.

Furthermore, it is preferable that the cumulative amount of light at the coating layer surface during the second active energy ray irradiation has a value within the range of 5 to 300 mJ/cm$^2$.

The reason for this is that, if such a cumulative amount of light has a value of below 5 mJ/cm$^2$, it may be difficult to extend the second columnar structure region sufficiently from the upper part toward the lower part. On the other hand, it is because if such a cumulative amount of light has a value of above 300 mJ/cm$^2$, the resulting film may undergo coloration.

Therefore, it is more preferable that the cumulative amount of light at the coating layer surface is adjusted to a value within the range of 30 to 200 mJ/cm$^2$, and even more preferably to a value within the range of 50 to 150 mJ/cm$^2$.

Furthermore, it is preferable that the second active energy ray irradiation is carried out in a non-oxygen atmosphere.

The reason for this is that when the second active energy ray irradiation is carried out in a non-oxygen atmosphere, the second columnar structure region can be formed efficiently by suppressing the influence of oxygen inhibition in the columnar structure-unformed region obtained by the first active energy ray irradiation.

That is, it is because if the second active energy ray irradiation is carried out not in a non-oxygen atmosphere but in an oxygen atmosphere, when the composition is irradiated at a high illuminance, the second columnar structure region may be formed at a very shallow position near the surface; however, a difference in refractive index that is necessary for light diffusion may not be obtained. Furthermore, it is because when the composition is irradiated at a low illuminance, the second columnar structure region may not be formed in the columnar structure-unformed region under the influence of oxygen inhibition.

Meanwhile, the term "in a non-oxygen atmosphere" means the conditions in which the surface of the coating layer is not in direct contact with an oxygen atmosphere, or an atmosphere containing oxygen.

Therefore, for example, performing the second active energy ray irradiation in a state in which the surface of the coating layer is laminated with a film, or in a state in which nitrogen purging has been performed by replacing air with nitrogen gas, corresponds to the second active energy ray irradiation "in a non-oxygen atmosphere".

Furthermore, regarding the second active energy ray irradiation "in a non-oxygen atmosphere" described above, it is particularly preferable to perform second active energy ray irradiation in a state of having an active energy radiation transmitting sheet laminated on the surface of the coating layer.

The reason for this is that, by performing the second active energy ray irradiation as such, the influence of oxygen inhibition can be suppressed effectively, and the second columnar structure region can be formed more efficiently in the columnar structure-unformed region.

That is, when an active energy ray transmitting sheet is laminated on the surface of the coating layer, an active energy radiation can be effectively irradiated to the coating layer by causing the sheet to transmit the radiation, while stably preventing the surface of the coating layer from being brought into contact with oxygen.

Meanwhile, regarding the active energy radiation transmitting sheet, any sheet capable of transmitting active energy radiation among the process sheets described in connection with step (b) (application step) can be used without any particular limitations.

Meanwhile, it is also preferable to further irradiate active energy radiation apart from the first and second active energy ray irradiation, so as to obtain a cumulative amount of light that allows sufficient curing of the coating layer.

Since the active energy radiation used at this time is intended to sufficiently cure the coating layer, it is preferable to use not parallel light, but a light which is random in any direction of propagation between the longitudinal direction and the width direction of the film.

Also, the light diffusion film after the photocuring step is finally brought into a state of being usable, by detaching the process sheet.

As described above, according to the present invention, since the first columnar structure region and the second columnar structure region are respectively formed by the first active energy ray irradiation and the second active energy ray irradiation, the combination of the angles of inclination of the pillar-shaped objects in the respective columnar structure regions can be regulated easily.

That is, the combination of the angles of inclination of the pillar-shaped objects in the various columnar structure regions can be regulated easily by simply appropriately regulating the angle of irradiation for each of the active energy ray irradiations.

EXAMPLES

Hereinafter, the light diffusion film of the present invention and the like will be explained in more detail by way of Examples.

Example 1

1. Synthesis of Component (B)

In a container, 2 moles of isophorone diisocyanate (IPDI) as a component (B1) and 2 moles of 2-hydroxyethyl methacrylate (HEMA) as a component (B3) were introduced with respect to 1 mole of polypropylene glycol (PPG) having a weight average molecular weight of 9,200 as a component (B2), and then the compounds were reacted according to a conventional method. Thus, a polyether urethane methacrylate having a weight average molecular weight of 9,900 was obtained.

Meanwhile, the weight average molecular weights of polypropylene glycol and polyether urethane methacrylate are values calculated relative to polystyrene standards measured by gel permeation chromatography (GPC) under the following conditions:

GPC analyzer: manufactured by Tosoh Corp., HLC-8020
GPC column: manufactured by Tosoh Corp. (hereinafter, described in order of passage)
TSK GUARD COLUMN HXL-H
TSK GEL GMHXL (x2)
TSK GEL G2000HXL
Measurement solvent: Tetrahydrofuran
Measurement temperature: 40° C.

2. Preparation of Composition for Light Diffusion Film

Subsequently, a composition for light diffusion film was obtained by mixing 100 parts by weight of a polyether urethane methacrylate having a weight average molecular weight of 9,900 as the component (B) thus obtained, with 100 parts by weight of o-phenylphenoxy ethoxyethyl acrylate (manufactured by Shin Nakamura Chemical Co., Ltd., NK ESTER A-LEN-10) represented by the following Formula (3) and having a molecular weight of 268 as component (A), and 8 parts by weight of 2-hydroxy-2-methyl-1-phenylpropan-1-one as component (C), and then heating and mixing the mixture under the conditions of 80° C.

Meanwhile, the refractive indices of the component (A) and the component (B) were measured according to JIS K0062 using an Abbe refractometer (manufactured by Atago Co., Ltd., ABBE REFRACTOMETER DR-M2, Na light source, wavelength: 589 nm), and the refractive indices were 1.58 and 1.46, respectively.

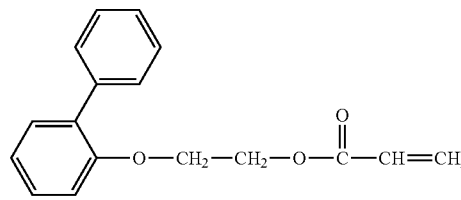

(3)

3. Application of Composition for Light Diffusion Film

Subsequently, the composition for light diffusion film thus obtained was applied on a film-like transparent polyethylene terephthalate (hereinafter, referred to as PET) as a process sheet, and thus a coating layer having a film thickness of 105 µm was obtained.

4. First Ultraviolet Irradiation

Subsequently, the coating layer was irradiated with parallel light having a parallelism of 2° or less such that the angle of irradiation (θ3 in FIG. 9) would be almost 0°, using an ultraviolet spot parallel light source (Japan Technology System Corp.) having the central ray parallelism controlled to ±3° or less.

The peak illuminance at that time was set to 0.98 mW/cm², the cumulative amount of light was set to 19.78 mJ/cm², the lamp height was set to 240 mm, and the travel speed of the coating layer was set to 0.17 m/min.

5. Second Ultraviolet Irradiation

Subsequently, after the first ultraviolet irradiation step was carried out, the exposed surface side of the coating layer was laminated with an ultraviolet transmissive peeling film having a thickness of 38 µm (manufactured by Lintec Corp., SP-PET382050), and the laminate was brought into a state in a non-oxygen atmosphere.

Subsequently, similarly to the first ultraviolet irradiation step, the coating layer was irradiated with parallel light through the peeling film such that the angle of irradiation (θ3 in FIG. 9) would be almost 0°, and thus a light diffusion film having a film thickness of 105 µm was obtained.

The peak illuminance at that time was set to 2.88 mW/cm², the cumulative amount of light was set to 20.06 mJ/cm², the lamp height was set to 240 mm, and the travel speed of the coating layer was set to 0.54 m/min.

Meanwhile, the film thickness of the light diffusion film was measured using a constant pressure thickness meter (manufactured by Takara Co., Ltd., TECLOCK PG-02J).

Figure 10A:
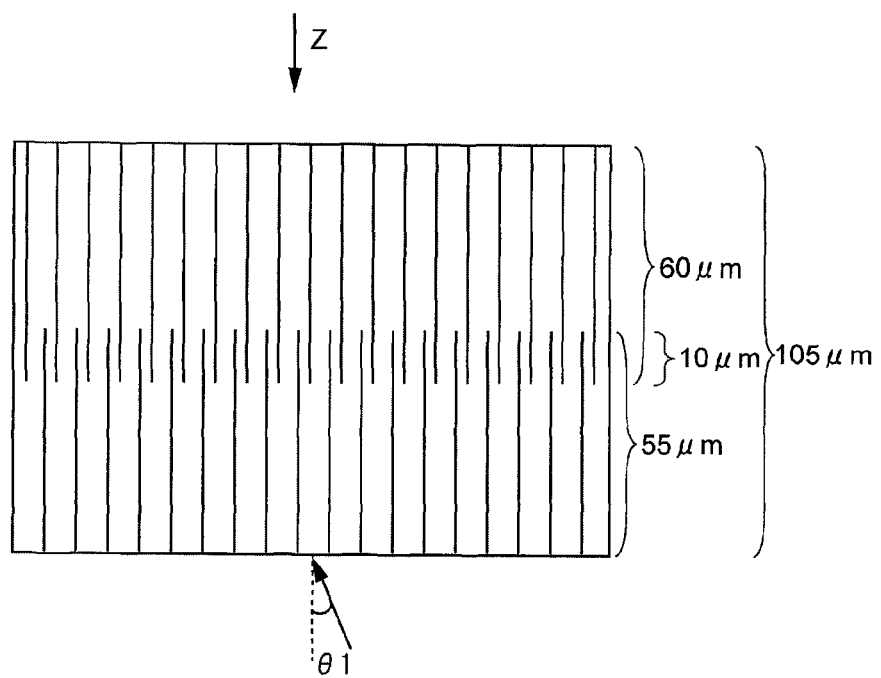
FIGS. 10(a) and 10(b) are a schematic diagram and a photograph of a cross-section in the light diffusion film of Example 1.

Furthermore, it was confirmed that, as illustrated in the schematic diagram of a film cross-section in FIG. 10(a), the light diffusion film thus obtained was a light diffusion film which had a first columnar structure region formed in the lower part of the film and a second columnar structure region formed in the upper part of the film, and had an overlapping columnar structure region formed by these columnar structure regions partially overlapping.

Meanwhile, FIG. 10(a) is a schematic diagram of a cross-section obtained in a case in which the film was cut at a plane that was parallel to the travel direction of the coating layer and was perpendicular to the film plane.

Furthermore, the film thickness of the first columnar structure region was 55 µm, the film thickness of the second columnar structure region was 60 µm, and the film thickness of the overlapping columnar structure region was 10 µm.

Furthermore, the angle of inclination of the pillar-shaped objects in the first columnar structure region, that is, the angle of inclination of the pillar-shaped objects when the angle of the normal line to the film surface, which was measured at a cross-section in a case in which the film was cut by a plane that cuts one whole pillar-shaped object into two along the axial line, was designated as 0° (θa=θb in FIG. 6), was 0°. The angle of inclination of the pillar-shaped objects in the second columnar structure region measured at the same cross-section (θa'=θb' in FIG. 6) was also 0°.

Figure 10B:
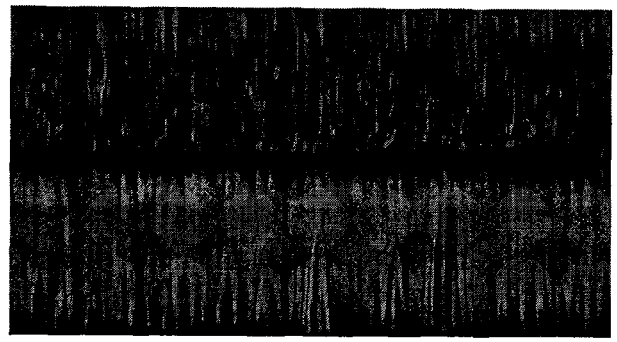

Furthermore, a cross-sectional photograph of the light diffusion film thus obtained is shown in FIG. 10(b). FIG. 10(b) is a cross-sectional photograph obtainable in a case in which the film was cut at a plane that was parallel to the travel direction of the coating layer and was perpendicular to the film plane.

6. Evaluation

Light was caused to enter the light diffusion film thus obtained, as illustrated in FIG. 10(a), through the lower side of the relevant film, that is, through the side where the first columnar structure region existed, while the incident angle θ1 (°) was varied to 40°, 35°, 30°, 25°, 20°, 15°, 10°, 5°, 0°, −5°, −10°, −15°, −20°, −25°, −30°, −35°, and −40°, using a conoscope (manufactured by Autronic-Melchers GmbH).

Photographs of the diffusion state of the diffused light at each of the incident angles θ1 were taken in the Z-direction as shown in FIG. 10(a). Photographs of the cases in which the incident angle θ1 was 40° to −40° are presented in FIGS. 11(a) to 11(q), respectively.

From such results, it is understood that when the first and second columnar structure regions are formed, despite being a thin film having a thickness of 105 μm, straight transmission of incident light can be prevented even if the incident angle θ1 of incident light is 0°, and thus uniform light diffusion characteristics are sufficiently obtained.

Example 2

In Example 2, a light diffusion film having a film thickness of 142 μm was obtained in the same manner as in Example 1, except that in regard to the step of applying the composition for light diffusion film, the film thickness of the coating layer was changed to 142 μm, and in regard to the second ultraviolet irradiation step, the angle of irradiation of parallel light (θ3 in FIG. 9) was changed to 30°, the peak illuminance was changed to 2.75 mW/cm$^2$, and the cumulative amount of light was changed to 19.50 mJ/cm$^2$.

Figure 12A:
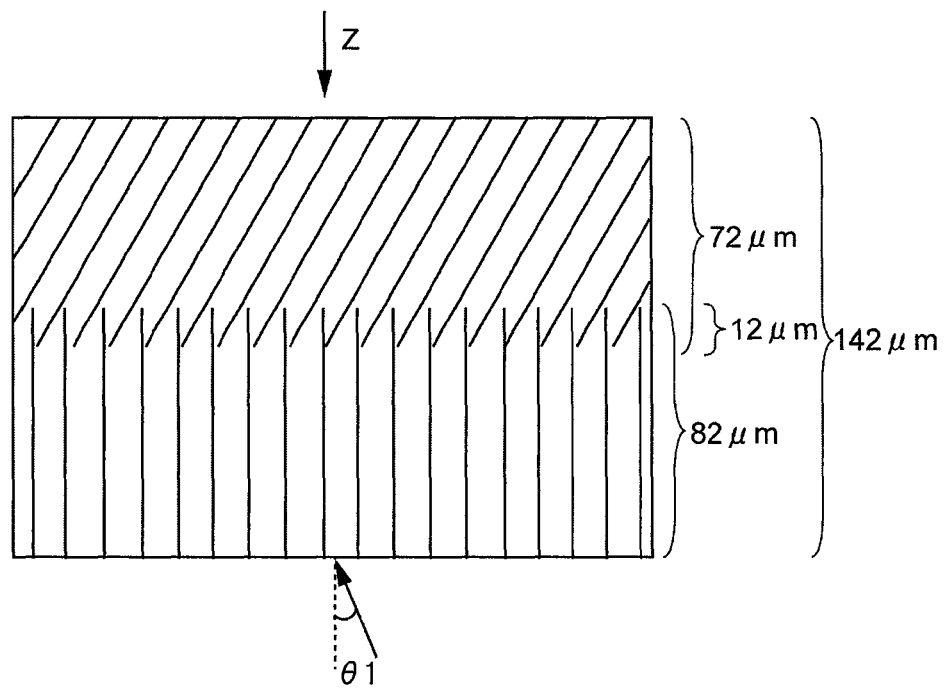
FIGS. 12(a) and 12(b) are a schematic diagram and a photograph of a cross-section of the light diffusion film of Example 2.

Furthermore, it was confirmed that the light diffusion film thus obtained was a light diffusion film in which, as illustrated in the schematic diagram of a film cross-section of FIG. 12(a), a first columnar structure region was formed in the lower part of the film and a second columnar structure region was formed in the upper part of the film.

Meanwhile, FIG. 12(a) is a schematic diagram of a cross-section obtainable in a case in which the film was cut at a plane that was parallel to the travel direction of the coating layer and was perpendicular to the film plane.

Furthermore, the film thickness of the first columnar structure region was 82 μm, the film thickness of the second columnar structure region was 72 μm, and the film thickness of the overlapping columnar structure was 12 μm.

Furthermore, the angle of inclination of the pillar-shaped objects in the first columnar structure region (θa=θb in FIG. 6) was 0°, and the angle of inclination of the pillar-shaped objects in the second columnar structure region measured at the same cross-section (θa'=θb' in FIG. 6) was 30°.

Figure 12B:
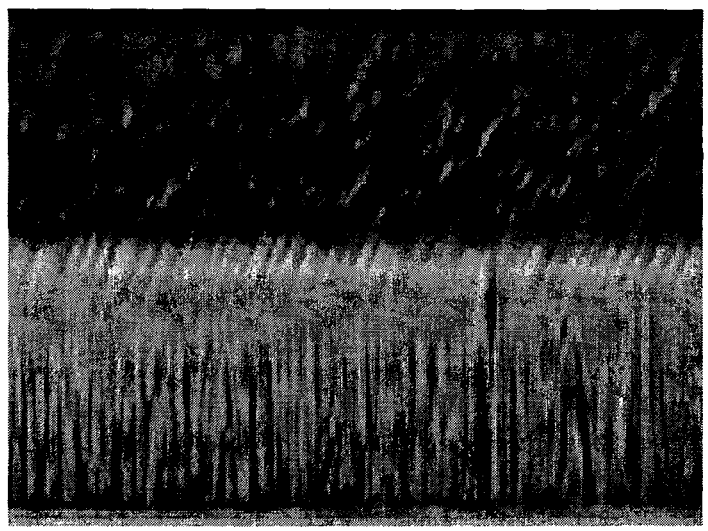

Furthermore, a cross-sectional photograph of the light diffusion film thus obtained is presented in FIG. 12(b). FIG. 12(b) is a cross-sectional photograph obtainable in the case in which the film was cut at a plane that was parallel to the travel direction of the coating layer and was perpendicular to the film plane.

Furthermore, the diffusion state of diffused light in the case in which the incident angle θ1 was changed in the same manner as in Example 1.

That is, as illustrated in FIG. 12(a), light was caused to enter the light diffusion film thus obtained, through the lower part of the relevant film, while the incident angle θ1 (°) was varied to 40°, 35°, 30°, 25°, 20°, 15°, 10°, 5°, 0°, −5°, −10°, −15°, −20°, −25°, −30°, −35°, −40°, −45°, −50°, −55°, −60°, and −65°.

Then, photographs of the diffusion state of the diffused light at each of the incident angles θ1 were taken in the Z-direction of FIG. 12(a). Photographs of the cases in which the incident angle θ1 was 40° to −65° are presented in FIGS. 13(a) to 13(v), respectively.

From such results, it is understood that the light diffusion film exhibits isotropic light diffusion characteristics according to the angle of inclination of the pillar-shaped objects in the first and second columnar structure regions, respectively, or isotropic light diffusion characteristics that have been complexed by passing through two columnar structure regions, at a wide range of incident angles of incident light.

Example 3

In Example 3, in regard to the step of applying the composition for light diffusion film, the film thickness of the coating layer was changed to 142 μm, and in regard to the first ultraviolet irradiation step, the angle of irradiation of parallel light (θ3 in FIG. 9) was changed to 30°, the peak illuminance was changed to 1.05 mW/cm$^2$, the cumulative amount of light was changed to 20.88 mJ/cm$^2$, and the travel speed of the coating layer was changed to 0.17 m/min.

Furthermore, in regard to the second ultraviolet irradiation step, the angle of irradiation of parallel light (θ3 in FIG. 9) was changed to −30°, the peak illuminance was changed to 2.75 mW/cm$^2$, and the cumulative amount of light was changed to 19.50 mJ/cm$^2$.

Other than that, a light diffusion film having a film thickness of 142 μm was obtained in the same manner as in Example 1.

Figure 14A:
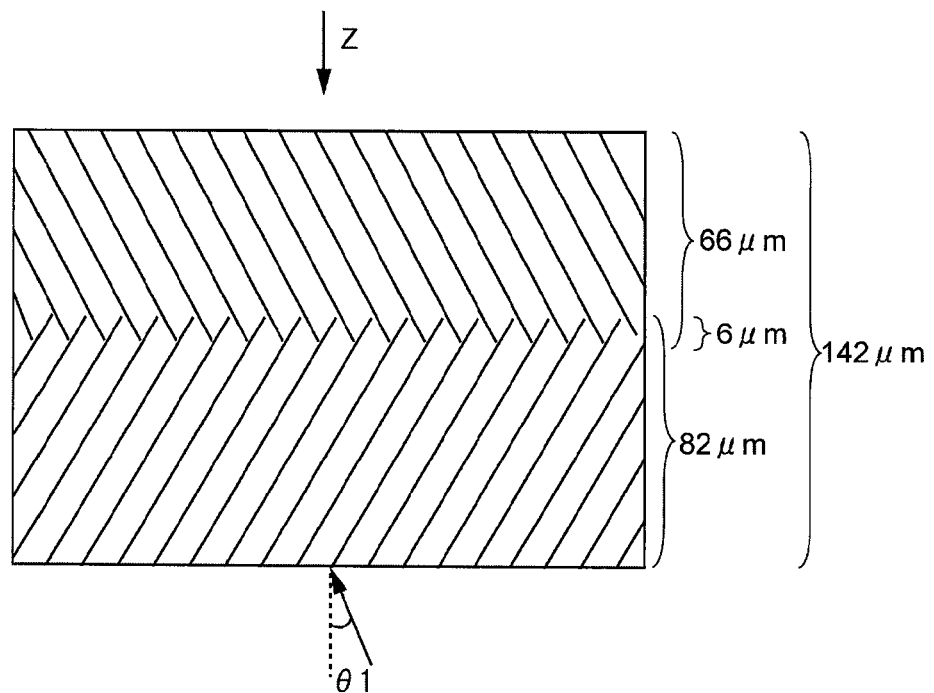
FIGS. 14(a) and 14(b) are a schematic diagram and a photograph of a cross-section of the light diffusion film of Example 3.

Furthermore, it was confirmed that the light diffusion film thus obtained was a light diffusion in which, as illustrated in the schematic diagram of the film cross-section of FIG. 14(a), a first columnar structure region was formed in the lower part of the film, and a second columnar structure region was formed in the upper part of the film.

Meanwhile, FIG. 14(a) is a schematic diagram of a cross-section obtainable when the film was cut at a plane that was parallel to the travel direction of the coating layer and was perpendicular to the film surface.

Furthermore, the film thickness of the first columnar structure region was 82 μm, the film thickness of the second columnar structure region was 66 μm, and the film thickness of the overlapping columnar structure region was 6 μm.

Furthermore, the angle of inclination of the pillar-shaped objects in the first columnar structure region (θa=θb in FIG. 6) was 30°, and the angle of inclination of the pillar-shaped objects in the second columnar structure region measured at the same cross-section (θa'=θb' in FIG. 6) was 30°

Figure 14B:
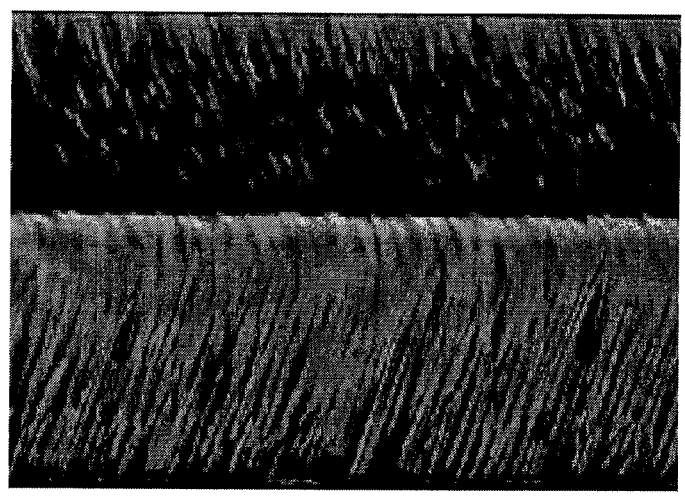

Furthermore, a cross-sectional photograph of the light diffusion film thus obtained is presented in FIG. 14(b). FIG. 14(b) is a cross-sectional photograph obtained in the case in which the film was cut at a plane that is parallel to the travel direction of the coating layer and is perpendicular to the film plane.

Furthermore, the diffusion state of diffused light in the case of varying the incident angle θ1 was evaluated in the same manner as in Example 1.

That is, as illustrated in FIG. 14(a), light was caused to enter the light diffusion film thus obtained, through the lower part of the relevant film, while the incident angle θ1 (°) was varied to 60°, 55°, 50°, 45°, 40°, 35°, 30°, 25°, 20°, 15°, 10°, 5°, 0°, −5°, −10°, −15°, −20°, −25°, −30°, −35°, −40°, −45°, −50°, and −55°.

Furthermore, photographs of the diffusion state of diffused light at each of the incident angles θ1 were taken in the Z-direction in FIG. 14(a). Photographs of the cases in which the incident angle θ1 was 60° to −55° are presented in FIGS. 15(a) to 15(x), respectively.

From such results, it is understood that the light diffusion film exhibits isotropic light diffusion characteristics according to the angle of inclination of the pillar-shaped objects in the first and second columnar structure regions, respectively, or isotropic light diffusion characteristics that have been complexed by passing through two columnar structure regions, at a wide range of incident angles of incident light.

Comparative Example 1

In Comparative Example 1, in regard to the second ultraviolet irradiation step, scattered light at a peak illuminance of 10.2 mW/cm$^2$ and a cumulative amount of light of 142.2 mJ/cm$^2$ was irradiated, and the travel speed of the coating layer was changed to 0.40 m/min.

Other than that, a light diffusion film having a film thickness of 152 μm was obtained in the same manner as in Example 1.

Figure 16A:
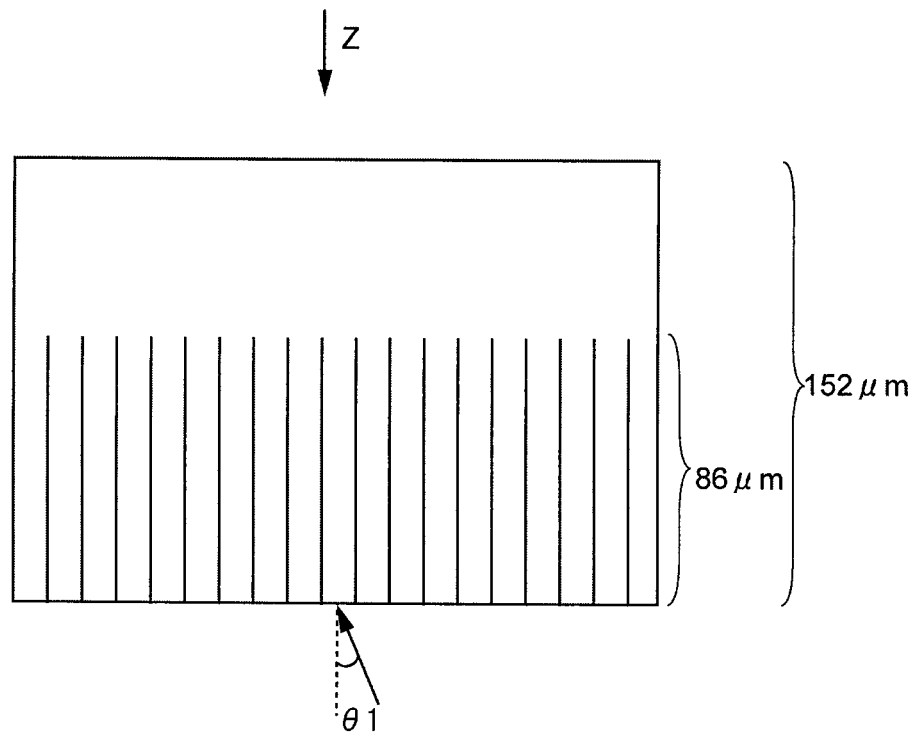
FIGS. 16(a) and 16(b) are a schematic diagram and a photograph of a cross-section of the light diffusion film of Comparative Example 1.

Furthermore, it was confirmed that, as illustrated in the schematic diagram of the film cross-section of FIG. 16(a), the light diffusion film thus obtained was a light diffusion film in which a first columnar structure region was formed in the lower part of the film, and a second columnar structure region was not formed in the upper part of the film.

Meanwhile, FIG. 16(a) is a schematic diagram of a cross-section obtainable when the film was cut at a plane that was parallel to the travel direction of the coating layer and was perpendicular to the film plane.

Furthermore, the film thickness of the first columnar structure region was 86 μm, and the angle of inclination of the pillar-shaped objects in the first columnar structure region ($\theta a=\theta b$ in FIG. 6) was 0°.

Figure 16B:
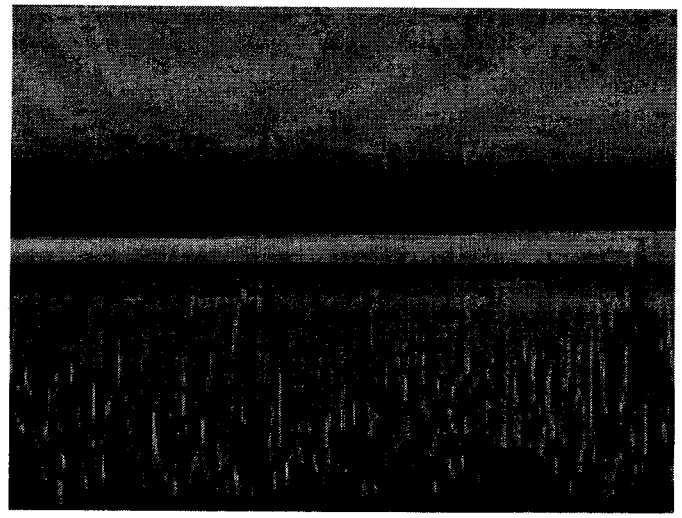

Furthermore, a cross-sectional photograph of the light diffusion film thus obtained is presented in FIG. 16(b). FIG. 16(b) is a cross-sectional photograph in the case in which the film was cut at a plane that was parallel to the travel direction of the coating layer and was perpendicular to the film plane.

Furthermore, the diffusion state of diffused light in the case in which the incident light $\theta 1$ was changed was evaluated in the same manner as in Example 1.

That is, as illustrated in FIG. 16(a), light was caused to enter the light diffusion film thus obtained, through the lower part of the relevant film, while the incident angle $\theta 1$ (°) was varied to 40°, 35°, 30°, 25°, 20°, 15°, 10°, 5°, 0°, –5°, –10°, –15°, –20°, –25°, –30°, –35°, and –40°.

Then, photographs of the diffusion state of diffused light at each of the incident angles $\theta 1$ were taken in the Z-direction in FIG. 16(a). Photographs of the cases in which the incident angle $\theta 1$ was 40° to –40° are presented in FIGS. 17(a) to 17(q), respectively.

From such results, it is understood that when compared with Example 1, despite that the total film thickness was thicker than that of the light diffusion film of Example 1, sufficiently uniform light diffusion characteristics were not obtained because the film thickness of the columnar structure region was thin, as can be seen from the results of an observation of the cross-section.

Particularly, it is understood that when the incident angle $\theta 1$ of incident light is 0°, straight transmission of incident light may not be prevented, and the light diffusion characteristics become markedly non-uniform.

Comparative Example 2

In Comparative Example 2, in regard to the step of applying the composition for light diffusion film, the film thickness of the coating layer was changed to 138 μm, and in regard to the first ultraviolet irradiation step, the angle of irradiation of parallel light ($\theta 3$ in FIG. 9) was changed to 30°, the peak illuminance was changed to 2.75 mW/cm$^2$, the cumulative amount of light was changed to 19.50 mJ/cm$^2$, and the travel speed of the coating layer was changed to 0.54 m/min.

Furthermore, in regard to the second ultraviolet irradiation step, scattered light at a peak illuminance of 10.2 mW/cm$^2$ and a cumulative amount of light of 142.2 mJ/cm$^2$ was irradiated, and also, the travel speed of the coating layer was changed to 0.40 m/min.

Other than that, a light diffusion film having a film thickness of 138 μm was obtained in the same manner as in Example 1.

Figure 18A:
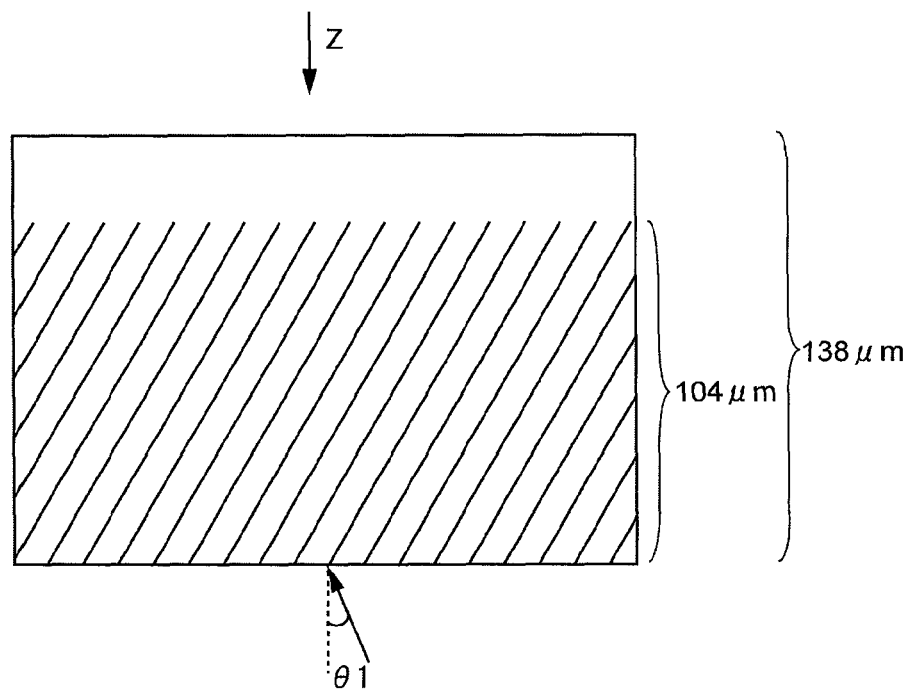
FIGS. 18(a) and 18(b) are a schematic diagram and a photograph of a cross-section of the light diffusion film of Comparative Example 2.

Also, it was confirmed that, as illustrated in the schematic diagram of the film cross-section of FIG. 18(a), the light diffusion film thus obtained was a light diffusion film in which a first columnar structure region was formed in the lower part of the film, and a second columnar structure region was not formed in the upper part of the film.

Meanwhile, FIG. 18(a) is a schematic diagram of a cross-section obtainable when the film was cut at a plane that was parallel to the travel direction of the coating layer and was perpendicular to the film plane.

Furthermore, the film thickness of the first columnar structure region was 104 μm, and the angle of inclination of the pillar-shaped objects in the first columnar structure region ($\theta a=\theta b$ in FIG. 6) was 30°.

Figure 18B:
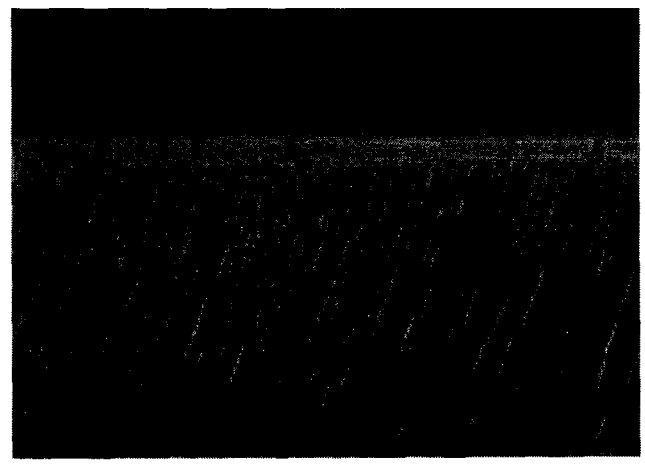

Furthermore, a cross-sectional photograph of the light diffusion film thus obtained is presented in FIG. 18(b). FIG. 18(b) is a cross-sectional photograph in the case in which the film was cut at a plane that was parallel to the travel direction of the coating layer and was perpendicular to the film plane.

Furthermore, the diffusion state of diffused light in the case in which the incident light $\theta 1$ was changed was evaluated in the same manner as in Example 1.

That is, as illustrated in FIG. 18(a), light was caused to enter the light diffusion film thus obtained, through the lower part of the relevant film, while the incident angle $\theta 1$ (°) was varied to 10°, 5°, 0°, –50, –10°, –15°, –20°, –25°, –30°, –35°, –40°, –45°, –50°, –55°, –60°, and –65°.

Then, photographs of the diffusion state of diffused light at each of the incident angles $\theta 1$ were taken in the Z-direction in FIG. 18(a). Photographs of the cases in which the incident angle $\theta 1$ was 10° to –65° are presented in FIGS. 19(a) to 19(p), respectively.

From such results, it is understood that when compared with Example 3, since the first ultraviolet irradiation was performed at a higher illuminance than in the case of Example 3, the film thickness of the first columnar structure region was thicker, and the uniformity of isotropic light diffusion in the first columnar structure region alone was high; however, in a wide range of the incident angle of incident light, light diffusion characteristics may not be sufficiently manifested.

INDUSTRIAL APPLICABILITY

As discussed above, according to the present invention, the uniformity of the intensity of diffused light in the light diffusion angle region can be increased, or the light diffusion angle region can be expanded effectively, by forming a first columnar structure region and a second columnar structure region in a same film.

Therefore, the light diffusion film or the like of the present invention can be supplied to a light control film for a reflective type liquid crystal display devices, as well as a viewing angle control film, a viewing angle expansion film, and a screen for projection, and it is expected that the light diffusion film can contribute markedly to an enhancement of the product quality of these devices.

EXPLANATIONS OF LETTERS OR NUMERALS

1: Coating layer
2: Process sheet
10: Light diffusion film (isotropic light diffusion film)
12: Pillar-shaped object having a relatively high refractive index
13: Columnar structure region
13': Boundary surface of columnar structure
14: Region having a relatively low refractive index
20: First columnar structure region
20': Columnar structure-unformed region
30: Second columnar structure region
40: Light diffusion film of the invention
50: Overlapping columnar structure region
60: Irradiated light from light source
70: Parallel light
125: Linear light source
200: Irradiated light parallelizing member
202: Point light source
204: Lens
210: Light blocking member
210a: Plate-shaped member
210b: Cylindrical member

The invention claimed is:

1. A light diffusion film comprising a single-layered light diffusion layer including, sequentially from the lower part of the film along a film thickness direction, a first columnar structure region and a second columnar structure region, in which plural pillar-shaped objects having a relatively high refractive index are arranged to stand close together in a region having a relatively low refractive index, the light diffusion film being a photocured product of a composition for a light diffusion film, and
wherein the light diffusion film comprises an overlapping columnar structure region in which an upper end of the first columnar structure region extends into a lower end of the second columnar structure region so that the upper end of the first columnar structure region and the lower end of the second columnar structure region overlap with each other in a cross-section of the light diffusion film when the light diffusion film is cut at a plane that is perpendicular to a light diffusion film plane and cuts the pillar-shaped objects into two along axial lines in the first columnar structure region and the second columnar structure region.

2. The light diffusion film according to claim 1, wherein the overlapping columnar structure region is formed by tips of any one side of the pillar-shaped objects respectively originating from the first columnar structure region and the second columnar structure region, being brought into contact with a vicinity of the tips of the pillar-shaped objects originating from the other columnar structure region.

3. The light diffusion film according to claim 1, wherein a thickness of the overlapping columnar structure region is adjusted to a value within the range of 1 to 40 μm.

4. The light diffusion film according to claim 1, wherein a thickness of the overlapping columnar structure region is adjusted to a value within the range of 0.1% to 10% relative to a film thickness, taken as 100%.

5. The light diffusion film according to claim 1, wherein in the overlapping columnar structure region, the absolute value of the difference between angles of inclination of the pillar-shaped objects respectively originating from the first columnar structure region and the second columnar structure region is adjusted to a value of 1° or more.

6. The light diffusion film according to claim 1, wherein a main component of the pillar-shaped objects in the first columnar structure region and the second columnar structure region is a (meth)acrylic acid ester polymer containing plural aromatic rings, and a main component of the region having a relatively low refractive index is a polymer of urethane (meth)acrylate.

7. A method for manufacturing a light diffusion film, the method comprising the following steps (a) to (d):
(a) a step of preparing a composition for light diffusion film;
(b) a step of applying the composition for light diffusion film on a process sheet, and forming a coating layer;
(c) a step of subjecting the coating layer to first active energy ray irradiation, and forming a first columnar structure region in a lower portion of the coating layer, in which plural pillar-shaped objects having a relatively high refractive index are arranged to stand close together in a region having a relatively low refractive index, while leaving a columnar structure-unformed region in an upper portion of the coating layer; and
(d) a step of subjecting the coating layer to second active energy ray irradiation, and forming a second columnar structure region in the columnar structure-unformed region, in which plural pillar-shaped objects having a relatively high refractive index are arranged to stand close together in a region having a relatively low refractive index, and wherein an upper end of the first columnar structure region extends into a lower end of the second columnar structure region so that the upper end of the first columnar structure region and the lower end of the second columnar structure region overlap with each other in a cross-section of the light diffusion film when the light diffusion film is cut at a plane that is perpendicular to a light diffusion film plane and cuts the pillar-shaped objects into two along axial lines in the first columnar structure region and the second columnar structure region.

8. The method for manufacturing a light diffusion film according to claim 7, wherein the first active energy ray irradiation is performed in an oxygen-containing atmosphere, while the second active energy ray irradiation is performed in a non-oxygen atmosphere.

9. A light diffusion film comprising a single-layered light diffusion layer including, sequentially from a lower part of the film along a film thickness direction, a first columnar structure region and a second columnar structure region, in which plural pillar shaped objects having a relatively high refractive index are arranged to stand close together in a region having a relatively low refractive index,
wherein the light diffusion film comprises an overlapping columnar structure region in which an upper end of the first columnar structure region extends into a lower end of the second columnar structure so that the upper end of the first columnar structure region and the lower end of the second columnar structure region overlap with each other in a cross-section of the light diffusion film when the light diffusion film is cut at a plane that is perpendicular to a light diffusion plane and cuts the pillar shaped objects into two along axial lines in the first columnar structure region and the second columnar structure region,
a thickness of the overlapping columnar structure region is adjusted to a value within the range of 0.1% to 10% relative to a film thickness, taken as 100%, and a value obtained by subtracting the thickness of the overlapping columnar structure region from the sum of the thickness of the first columnar structure region and the second columnar structure region is adjusted to a value of 80% or more relative to the film thickness, taken as 100%.

* * * * *